(12) United States Patent
Kobayashi

(10) Patent No.: US 8,885,197 B2
(45) Date of Patent: Nov. 11, 2014

(54) INFORMATION PROCESSING SYSTEM, IMAGE FORMING APPARATUS, MANAGEMENT APPARATUS, INFORMATION PROCESSING METHOD, AND STORAGE MEDIUM FOR DELETING OR RETREATING IMAGE FORMING APPARATUS DATA

(75) Inventor: Makoto Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 13/547,865

(22) Filed: Jul. 12, 2012

(65) Prior Publication Data
US 2013/0016399 A1  Jan. 17, 2013

(30) Foreign Application Priority Data

Jul. 15, 2011  (JP) .................................. 2011-156727

(51) Int. Cl.
  *G06K 15/00* (2006.01)
  *G06F 3/12* (2006.01)
  *H04N 1/32* (2006.01)
  *G06K 15/02* (2006.01)
  *H04N 1/00* (2006.01)

(52) U.S. Cl.
  CPC ...... *G06F 3/1231* (2013.01); *H04N 2201/3278* (2013.01); *H04N 2201/3204* (2013.01); *H04N 2201/218* (2013.01); *H04N 2201/3276* (2013.01); *H04N 1/00973* (2013.01); *G06F 3/1204* (2013.01); *H04N 1/32122* (2013.01); *G06F 3/1288* (2013.01); *G06K 15/1805* (2013.01); *H04N 2201/0094* (2013.01); *H04N 1/00344* (2013.01); *G06K 15/402* (2013.01)
  USPC ........................................ 358/1.15; 358/1.16

(58) Field of Classification Search
  USPC ................................................ 358/1.15, 1.16
  See application file for complete search history.

(56) References Cited

U.S. PATENT DOCUMENTS

2009/0225366 A1* 9/2009 Emori ........................ 358/1.15
2010/0195147 A1* 8/2010 Tamura ...................... 358/1.15

FOREIGN PATENT DOCUMENTS

JP        2007-60186 A        3/2007
JP        2007-130838 A       5/2007

* cited by examiner

*Primary Examiner* — Qian Yang
(74) *Attorney, Agent, or Firm* — Canon USA, Inc., IP Division

(57) ABSTRACT

A system for managing operational setting information of an image forming apparatus, which is operable as an information processing system that enables a managing apparatus of the image forming apparatus to delete or retreat management data when the image forming apparatus performs data deletion processing or data retreat processing.

5 Claims, 24 Drawing Sheets

FIG.4A

| SETTING VALUE IDENTIFIER | VALUE |
|---|---|
| copy_settings.nup | 2 in 1 |
| device_settings.cloud_address | "http://ddd.com/config" |
| device_settings.sleep_time | 10 MINUTES |
| fax_settings.received_print | OFF |
| box_settings.server_address | "http://192.168.1.1/server/" |

FIG.4B

| SETTING VALUE IDENTIFIER | VALUE |
|---|---|
| copy_settings.nup | 2 in 1 |
| device_settings.cloud_address | "http://ddd.com/config" |
| device_settings.sleep_time | 10 MINUTES |
| fax_settings.received_print | ON |
| box_settings.server_address | "http://192.168.1.1/server/" |

FIG.4C

| SETTING VALUE IDENTIFIER | VALUE |
|---|---|
| copy_settings.nup | 2 in 1 |
| device_settings.cloud_address | "http://ddd.com/config" |
| device_settings.sleep_time | 10 SECONDS |
| fax_settings.received_print | ON |

FIG.6

| DEVICE IDENTIFIER | TENANT IDENTIFIER | VIRTUAL DEVICE CONFIGURATION DATA | VIRTUAL CONFIGURATION DATA | NOTIFICATION FLAG |
|---|---|---|---|---|
| 010001 | 100 | 1 | 1 | NOT COMPLETED |
| 010002 | 100 | 2 | 2 | NOT COMPLETED |
| 020001 | 100 | 3 | 3 | COMPLETED |
| 010010 | 200 | 4 | 4 | COMPLETED |

| SETTING VALUE IDENTIFIER | DEFAULT VALUE | VALUE RANGE | CONDITION |
|---|---|---|---|
| copy_settings.nup | 1 in 1 | 1 in 1, 2 in 1, 4 in 1 | NOTHING |
| device_settings.cloud_address | "http://ddd.com/config" | 256 BYTES | NOTHING |
| device_settings.sleep_time | 10 MINUTES | 1 MINUTE, 10 MINUTES, 1 HOUR | NOTHING |
| fax_settings.received_print | OFF | ON, OFF | FACSIMILE UNIT |
| box_settings.server_address | "" | 256 BYTES | NOTHING |

| SETTING VALUE IDENTIFIER | DEFAULT VALUE | VALUE RANGE | CONDITION |
|---|---|---|---|
| copy_settings.nup | 1 in 1 | 1 in 1, 2 in 1, 4 in 1 | NOTHING |
| device_settings.cloud_address | "http://ddd.com/config" | 256 BYTES | NOTHING |
| device_settings.sleep_time | 10 SECONDS | 10 SECONDS, 1 MINUTE, 10 MINUTES, 1 HOUR | NOTHING |
| fax_settings.received_print | OFF | ON, OFF | FACSIMILE UNIT |

402   403   404   405

| SETTING VALUE IDENTIFIER | VALUE |
|---|---|
| copy_settings.nup | 2 in 1 |
| device_settings.cloud_address | "http://ddd.com/config" |
| device_settings.sleep_time | 10 SECONDS |
| fax_settings.received_print | ON |
| box_settings.server_address | "http://192.168.1.1/server/" |

FIG.12

| DEVICE IDENTIFIER 1502 | TENANT IDENTIFIER 1503 | TERM OF CONTRACT 1504 | DEVICE SETTING VALUE 1505 | DEVICE APPLICATION 1506 | LIFE CYCLE 1507 | DEVICE AUTHENTICATION KEY 1508 | EXTERNAL SERVICE 1509 | RETREATED DATA 1510 |
|---|---|---|---|---|---|---|---|---|
| 010001 | 100 | 2015/12/31 | Binary | Login/OCR | NEW OPERATION IN PROGRESS | Binary | GDocs | none |
| 010002 | 100 | 2015/08/31 | Binary | Login/WF | RECYCLE(1) OPERATION IN PROGRESS | Binary | GDocs | none |
| 030003 | none | 2010/12/31 | none | none | RESTORATION IN PROGRESS | Binary | | locationA |
| 010010 | 200 | 2014/12/31 | Binary | Login/PDF | NEW OPERATION IN PROGRESS | Binary | MShareP | locationB |

FIG.13A

```
GET /servicedocument HTTP/1.1
Host: ddd-air.com
```

FIG.13B

```
HTTP/1.1 200 OK
Date: ...
Content-Type: application/atomserv+xml: charset=utf-8
Content-Length: nnn <service xmlns="..." xmlns: atom="http://www.w3.org/2005/Atom">
<workspace>
<atom:title>AIR Machines</atom:title>
<collection href="http://www.ddd-air.com/MFP/IR5900/ABC12345">
<atom:title>Entries</atom:title>
<accept>entry</accept>
</collection>
</workspace>
</service>
```

FIG.14A

GET /MFP/IR5900/ABC12345 HTTP/1.1
Host: ddd-air.com

FIG.14B

HTTP/1.1 200 OK
Date: ...
Content-Type: application/atomserv+xml: charset=utf-8
Content-Length: nnn
ETag: "/MFP/IR5900/ABC12345?132"
Last-Modified: Thu, 31 Mar 2011 15:42:41 GMT <feed xmlns="http://www.w3.org/2005/Atom" xml:base="http://www.ddd-air.com/MFP/IR5900/ABC12345">
<id>tag:ddd-air.com, 2011:/MFP/IR5900/ABC12345</id>
<title>Contract DB contents</title>
<updated>2011-03-31T15:42:41Z</updated>
<link rel="self" href="/MFP/IR5900/ABC12345" />
<link href="http://mfp.ddd-air.com" />
<entry>
<id>tag:ddd-air.com, 2011:/MFP/IR5900/ABC12345/1</id>
<title>Contract Term</title>
<link href="http://www.ddd-air.com/contractdb/MFP/IR5900/ABC12345" />
<contractdb>
  <deviceid>010001</deviceid>
  <tenantid>100</tenantid>
  <licenseterm>2015-12-31T23:59:59Z</licenseterm>
  <deviceapps>Login OCR</deviceapps>
  <lifecycle>1</lifecycle>
  <services>GDocs</services>
</contractdb>
<term>2012-12-31T00:00:00Z</term>
</entry>

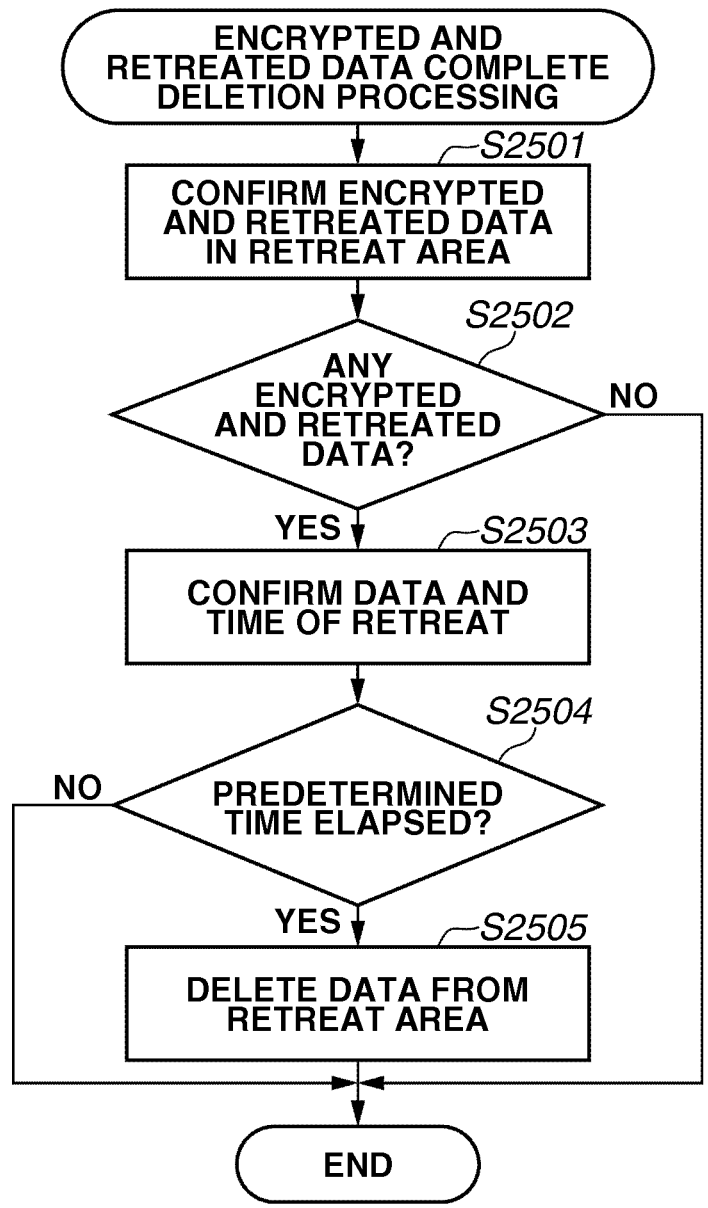

INFORMATION PROCESSING SYSTEM, IMAGE FORMING APPARATUS, MANAGEMENT APPARATUS, INFORMATION PROCESSING METHOD, AND STORAGE MEDIUM FOR DELETING OR RETREATING IMAGE FORMING APPARATUS DATA

BACKGROUND OF THE INVENTION

1. Field of the Invention

The present invention relates to an information processing system, an image forming apparatus, a management apparatus, an information processing method, and a storage medium.

2. Description of the Related Art

A conventionally proposed image forming apparatus can store configuration data in a storage unit. The configuration data is operational setting information usable to switch an operational state of the image forming apparatus.

The configuration data is stored in a storage unit of each image forming apparatus. Therefore, if it is required to change the configuration data of a plurality of image forming apparatuses, the configuration data change setting becomes troublesome. To decrease the time and labor in the configuration data change setting required for all of the image forming apparatuses, it is conventionally known that an information processing apparatus can perform batch setting of configuration data for a plurality of image forming apparatuses.

As discussed in Japanese Patent Application Laid-Open No. 2007-130838, a conventional image forming system is configured to enable a plurality of image forming apparatuses, when an initial setting operation is performed, to download initial system setting information from a server and reflect the downloaded information to initial setting contents. According to the above-described conventional image forming system, even when the initial setting information of an image forming apparatus is lost, the initial setting information can be delivered again from the server to the image forming apparatus.

Further, as discussed in Japanese Patent Application Laid-Open No. 2007-60186, it is conventionally known that a cooperative processing apparatus can discard job data relating to cooperative processing in response to a detection of abnormality in cooperative processing performed between an external apparatus and an image forming apparatus.

According to the image forming system discussed in Japanese Patent Application Laid-Open No. 2007-130838, in an event that an image forming apparatus is restored or scrapped, the data relating to the image forming apparatus that possibly includes personal data may not be surely deleted and may remain in the image forming apparatus itself or in an external apparatus accessible via a network.

For example, it is now assumed that a system includes an image forming apparatus and a management apparatus, in which the management apparatus can manage operational setting information of the image forming apparatus and can deliver operational setting information to the image forming apparatus. If the information relating to the image forming apparatus is deleted by a user when the image forming apparatus is scrapped, it is desired for the management apparatus to delete management information of the scrapped image forming apparatus correspondingly.

Further, in the above-described system, if the data relating to the image forming apparatus and the management data of the image forming apparatus are simply and automatically deleted, some of important data may be erroneously deleted. Accordingly, depending on a phenomenon occurring in an image forming apparatus, it may be desired to temporarily encrypt and retreat the data without deleting the data immediately after the occurrence of the phenomenon (hereinbelow retreating processing).

SUMMARY OF THE INVENTION

The present invention is directed to an information processing system, an image forming apparatus, a management apparatus, and an information processing method, in which if image forming apparatus related data is deleted or retreated, a managing apparatus of the image forming apparatus can delete or retreat the related management data appropriately.

According to an aspect of the present invention, an information processing system includes a management apparatus that can manage at least operational setting information to be used to switch an operational state of an image forming apparatus and an image forming apparatus that can be managed by the management apparatus in each predetermined unit of management. The image forming apparatus includes at least one processor coupled via a bus to a memory, the processor being programmed to control one or more of: a request unit configured to transmit an operational setting information generation request that corresponds to the image forming apparatus, which includes changed configuration information, to the management apparatus, if there is any change in configuration information of a device included in the image forming apparatus; an acquiring unit configured to acquire operational setting information that corresponds to the image forming apparatus from the management apparatus that has generated the operational setting information according to the operational setting information generation request; and a first retreat/deletion processing unit configured to perform retreat processing for encrypting and retreating information relating to the image forming apparatus, including at least the operational setting information, or perform deletion processing for deleting information relating to the image forming apparatus. The first retreat/deletion processing unit is configured to instruct a second retreat/deletion processing unit included in the management apparatus, via a network, to retreat management information of the image forming apparatus when the retreat processing is executed for the information relating to the image forming apparatus, and configured to instruct the second retreat/deletion processing unit included in the management apparatus, via the network, to delete the management information of the image forming apparatus when the deletion processing is executed for the operational setting information. The management apparatus includes a request receiving unit configured to receive the operational setting information generation request that corresponds to the image forming apparatus from the image forming apparatus; a generating unit configured to generate operational setting information that corresponds to the image forming apparatus based on configuration information of a device included in the image forming apparatus, which is included in the operational setting information generation request; a transmitting unit configured to transmit the generated operational setting information to the image forming apparatus; and a second retreat/deletion processing unit configured to perform retreat processing for encrypting and retreating management information of the image forming apparatus, including at least information relating to management of the operational setting information, or perform deletion processing for deleting the management information of the image forming apparatus. The second retreat/deletion processing unit is configured to instruct the first retreat/deletion processing unit included in the image forming apparatus, via the network, to retreat the information relating to the image forming apparatus when the retreat processing is executed for the management information of the image forming apparatus, and configured to instruct the first retreat/deletion processing unit included in the image forming apparatus, via the network, to delete the information relating to the image forming apparatus when the deletion processing is executed for the management information of the image forming apparatus.

When an image forming apparatus performs data deletion processing or data retreat processing, the information processing system according to the present invention instructs a managing apparatus of the image forming apparatus to delete or retreat management data. Accordingly, when the image forming apparatus is scrapped, the information processing system according to the present invention can surely delete or retreated data relating to the image forming apparatus from the image forming apparatus itself as well as management data of the image forming apparatus from the managing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A, 4B, and 4C illustrate examples of actual configuration data.

FIG. 6 illustrates an example of a virtual device.

FIGS. 7A and 7B illustrate examples of model-dependent setting value schema.

FIG. 12 illustrates an example of contract data.

FIGS. 13A and 13B illustrate request and response examples that can be transmitted and received between an image forming apparatus and a contract management service.

FIGS. 14A and 14B illustrate another request and response examples that can be transmitted and received between the image forming apparatus and the contract management service.

FIG. 24 is an example flowchart illustrating a part of operation processing that can be performed by an information processing system according to another exemplary embodiment of the present invention.

DESCRIPTION OF THE EMBODIMENTS

Figure 1:
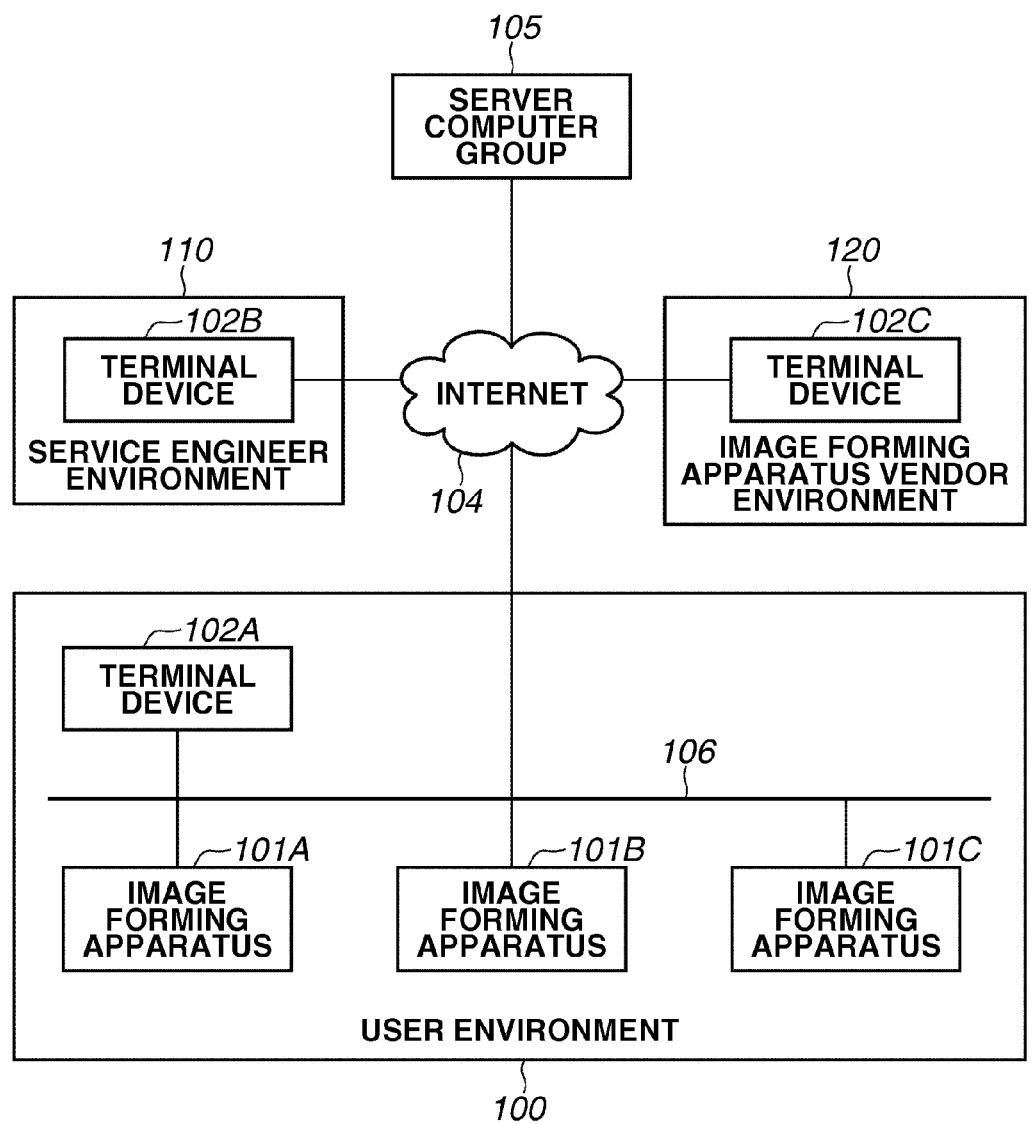
FIG. 1 illustrates an entire system configuration according to an exemplary embodiment of the present invention.

Various exemplary embodiments, features, and aspects of the invention will be described in detail below with reference to the drawings.

An information processing system according to the present exemplary embodiment is described below. First, the present exemplary embodiment includes technical terms defined in the following manner. The technical term "configuration data" is operational setting information usable to switch the operational state of the image forming apparatus.

For example, a default value of the imposition included in a copy job is an example of the configuration data. If the default value of the imposition is "1 in 1", one complete page is printed on a piece of paper, as a print result of the copy job. If the default value of the imposition is "2 in 1", two complete pages are printed on a piece of paper, as a print result of the copy job.

The technical term "device configuration data" indicates the configuration of a device included in the image forming apparatus. For example, the device configuration data indicates the presence of a facsimile unit included in the image forming apparatus. The device configuration data includes a model code that can uniquely identify the model of the image forming apparatus and a version of the firmware operating on the image forming apparatus.

The technical term "model-dependent setting value schema" is a data that can define the schema of configuration data held by the image forming apparatus for a specific model. The technical term "schema" is a data that can define the protocol and the positioning for each configuration data.

For example, the model-dependent setting value schema includes setting value identifier, default value, value range, and data enabling condition for each of configuration data. In the present exemplary embodiment, the configuration data to be held by each image forming apparatus is variable depending on the model. Therefore, it is required to prepare and manage a setting value schema dedicated to each model.

The technical term "virtual device" is a data group of actual devices that is held by a server computer group. More specifically, the virtual device includes at least device configuration data and configuration data. The technical term "tenant" is a unit of truster to whom a user trusts management of the image forming apparatus.

The technical term "tenant identifier" is an identifier that can uniquely identify each tenant. For example, it is now assumed that a company trusts management of image forming apparatuses 101A, 101B, and 101C that are operable in a user environment 100 illustrated in FIG. 1. In this case, a single tenant identifier that corresponds to the user environment 100 is allocated, so that the image forming apparatuses 101A, 101B, and 101C can be recognized and managed as image forming apparatuses belonging to the same tenant.

The data included in a virtual device, the data held by an actual device, and the data dedicated to a tenant can be discriminated from each other in the following manner. The device configuration data included in a virtual device is referred to as "virtual device configuration data." The configuration data of a virtual device is referred to as "virtual configuration data." The device configuration data held by an actual device is referred to as "actual device configuration data." The configuration data of an actual device is referred to as "actual configuration data." The configuration data commonly used in a tenant is referred to as "tenant-oriented configuration data."

The technical term "contract data" is a data group relating to the term of contract, device life cycle, and contract status of each image forming apparatus. The contract data is prepared for each image forming apparatus. More specifically, the contract data includes, at least, a device identifier, a tenant identifier, a term of contract, and a device life cycle. If desired, contract data can be provided for an image forming apparatus that is not currently in the contract state.

The technical term "encrypted and retreated data" indicates data that is encrypted by a virtual device or an actual device and copied and retreated to an appropriate retreat area. The device identifier or an administrator password is a parameter that can be used in the encryption of data. The encryption and retreat of data can be executed by a virtual device or an actual device, when a predetermined condition is satisfied. In this case, the technical term "predetermined condition" indicates expiration of the term of contract, or no access to the data during a predetermined time period.

In the following description, the encryption and retreat processing may be simply referred to as "retreat processing." The retreat processing target data is, for example, virtual device configuration data, virtual configuration data, actual device configuration data, and actual configuration data.

FIG. 1 illustrates an entire system configuration according to the present exemplary embodiment. The system illustrated in FIG. 1 includes the user environment 100, a server computer group 105, a service engineer environment 110, and an image forming apparatus vendor environment 120. The user environment 100 through the image forming apparatus vendor environment 120 can communicate with each other via Internet 104. The Internet 104 is a network that enables various devices to perform digital communications via a public communication circuit.

The user environment 100 is an environment in which a user of an image forming apparatus can operate the image forming apparatus. The user environment 100 includes a plurality of image forming apparatuses 101A, 101B, and 101C and a single terminal device 102A. Each of the image forming apparatuses 101A, 101B, and 101C is functionally operable as an image forming apparatus according to the present exemplary embodiment. The network 106 is a network that is provided in the user environment 100 to perform digital communications. Each of the image forming apparatuses 101A through 101C is accessible to the Internet 104 via the network 106. The terminal device 102A is a computer that can be operated by a user in the user environment 100. The terminal device 102A is accessible to the Internet 104 via the network 106.

The server computer group 105 is a server group that can provide various services via the Internet 104. In the present exemplary embodiment, the server computer group 105 is functionally operable as a management apparatus that can manage, at least, configuration data provided to respective image forming apparatuses. The server computer group 105 can manage each image forming apparatus in association with each tenant (i.e., a predetermined unit of management). Further, the server computer group 105 is functionally operable as a management apparatus that can manage contract information relating to a contract of each image forming apparatus.

The service engineer environment 110 is an environment in which a service engineer can operate a terminal device 102B to manage an image forming apparatus. The service engineer environment 110 includes the terminal device 102B. The terminal device 102B is a computer that enables the service engineer to manage the image forming apparatuses 101A, 101B, and 101C. The terminal device 102B is accessible to the Internet 104.

The image forming apparatus vendor environment 120 is an environment in which a management personnel of a vendor that manufactures the image forming apparatus performs maintenance of data required in the management of the image forming apparatus. The image forming apparatus vendor environment 120 includes a terminal device 102C. The terminal device 102C is a computer that can be operated by the management personnel who belongs to the vendor of the image forming apparatus.

The terminal device 102C is accessible to the Internet 104. In the following description, each of the image forming apparatuses 101A, 101B, and 101C may be simply referred to as "image forming apparatus 101." Further, each of the terminal devices 102B and 102C may be simply referred to as "terminal device 102."

Figure 2:
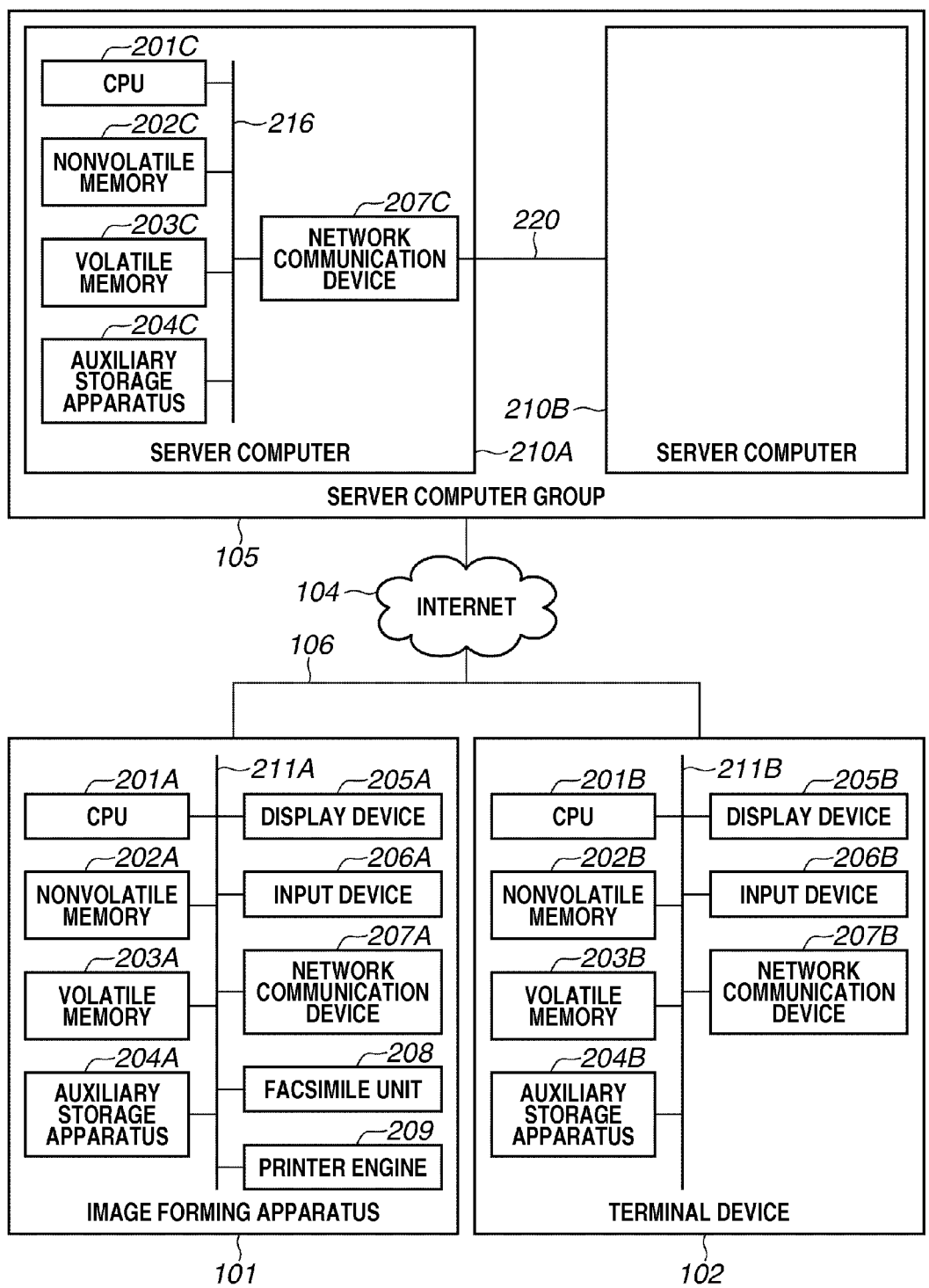
FIG. 2 illustrates an example hardware configuration of an information processing system according to an exemplary embodiment of the present invention.

FIG. 2 illustrates an example hardware configuration of the information processing system according to the present exemplary embodiment. The server computer group 105 includes a server computer 210A and a server computer 210B. The server computer 210B has a configuration similar to that of the server computer 210A. The server computer 210A and the server computer 210B can communicate with each other via a network 220.

The server computer 210A includes a central processing unit (CPU) 201C through a network communication device 207C that are connected to an internal bus 216. The image forming apparatus 101 includes a CPU 201A through a printer engine 209 that are connected to an internal bus 211A. Further, the terminal device 102 includes a CPU 201B through a network communication device 207B that are connected to an internal bus 211B.

In the following description, each of the CPUs 201A, 201B, and 201C may be simply referred to as "CPU 201." Each of the nonvolatile memories 202A, 202B, and 202C may be simply referred to as "nonvolatile memory 202." Each of the volatile memories 203A, 203B, and 203C may be simply referred to as "volatile memory 203." Each of auxiliary storage apparatuses 204A, 204B, and 204C may be simply referred to as "auxiliary storage apparatus 204."

Further, each of the display devices 205A and 205B may be simply referred to as "display device 205." Each of the input devices 206A and 206B may be simply referred to as "input device 206." Each of the network communication devices 207A and 207B may be simply referred to as "network communication device 207." Each of the internal buses 211A and 211B may be simply referred to as "internal bus 211."

The CPU 201 can execute each program and control various processing. The nonvolatile memory 202 includes a read only memory (ROM). The nonvolatile memory 202 stores programs and data, which are required in the initial stage of device launching processing. The volatile memory 203 includes a random access memory (RAM). The volatile memory 203 can temporarily store programs and data.

The auxiliary storage apparatus 204 is a mass storage apparatus, such as a hard disk drive or a RAM drive. The auxiliary storage apparatus 204 can store mass-storage data and hold execution codes of respective programs. Compared to the volatile memory 203, the auxiliary storage device 204 can be preferably used to store data to be stored for a long time. The display device 205 can perform information display processing to notify a user of the information. In the present exemplary embodiment, both the user and the service engineer may be collectively referred to as "user."

The input device 206 can receive an instruction selected by a user and transmit the received instruction to a program via the internal bus 211. The network communication device 207 is an apparatus that can communicate with an external apparatus via the network. A facsimile unit 208 is a hardware unit that can transmit image data formed by the image forming apparatus 101 or image data stored in the auxiliary storage apparatus 204A to an external apparatus via the network 106.

The facsimile unit 208 is an optional unit. The facsimile unit 208 may not be provided in the image forming apparatus 101. The printer engine 209 prints image data formed by the image forming apparatus 101 or image data stored in the auxiliary storage apparatus 101 on a paper medium.

Figure 3:
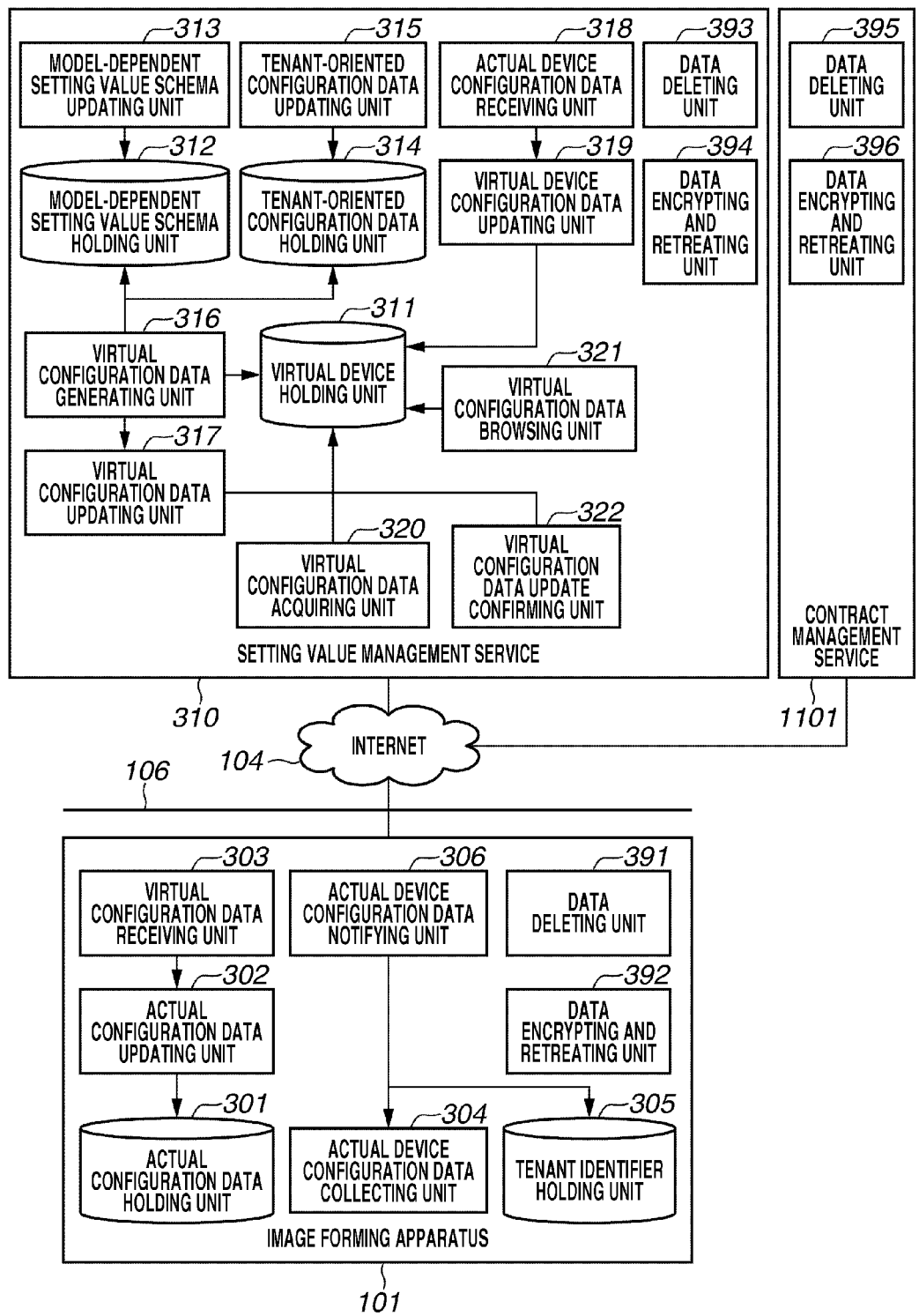
FIG. 3 is an example functional block diagram illustrating an information processing system according to an exemplary embodiment of the present invention.

FIG. 3 is an example functional block diagram illustrating an information processing system according to the present exemplary embodiment. The information processing system illustrated in FIG. 3 includes the image forming apparatus 101, a setting value management service 310, and a contract management service 1101. The image forming apparatus 101, the setting value management service 310, and the contract management service 1101 can communicate with each other via the Internet 104.

The setting value management service 310 and the contract management service 1101 are functionally operable as the management apparatus according to the present exemplary embodiment. Further, the information processing system illustrated in FIG. 3 can functionally realize an information processing method and a computer program according to the present exemplary embodiment.

The image forming apparatus 101 includes an actual configuration data holding unit 301, an actual configuration data updating unit 302, a virtual configuration data receiving unit 303, an actual device configuration data collecting unit 304, a tenant identifier holding unit 305, and an actual device configuration data notifying unit 306. Further, the image forming apparatus 101 includes a data deleting unit 391 and a data encrypting and retreating unit 392.

The actual configuration data holding unit 301 holds configuration data of the image forming apparatus. More specifically, the actual configuration data holding unit 301 stores the configuration data in the auxiliary storage apparatus 204A and manages the stored configuration data. The image forming apparatus 101 switches the operational behavior based on actual configuration data held by the actual configuration data holding unit 301.

The actual configuration data updating unit 302 can update the actual configuration data held by the actual configuration data holding unit 301. More specifically, the actual configuration data updating unit 302 updates the actual configuration data based on virtual configuration data acquired by the virtual configuration data receiving unit 303.

The virtual configuration data receiving unit 303 can send a virtual configuration data acquisition request to a virtual configuration data acquiring unit 320 included in the setting value management service 310. Then, the virtual configuration data receiving unit 303 can receive the virtual configuration data acquired by the virtual configuration data acquiring unit 320 from the virtual configuration data acquiring unit 320. The virtual configuration data receiving unit 303 can call the virtual configuration data acquiring unit 320 with reference to address information included in the actual configuration data held by the actual configuration data holding unit 301.

FIGS. 4A, 4B, and 4C illustrate examples of the actual configuration data. FIG. 4A illustrates actual configuration data of an image forming apparatus having a device identifier "010001." FIG. 4B illustrates actual configuration data of an image forming apparatus having a device identifier "010002." FIG. 4C illustrates actual configuration data of an image forming apparatus having a device identifier "020001." The device identifier is identification information having a value capable of uniquely identifying each image forming apparatus.

The actual configuration data includes data items of setting value identifier 702 and value 703. The setting value identifier 702 is an identifier that can uniquely identify a setting value included in the configuration data. The value 703 indicates a setting value of each identifier.

According to the example illustrated in FIG. 4A, the setting value (i.e., address) of an identifier "device_settings.cloud_address" is "http://ddd.com/config." The above-described address is an address of a setting value management service that can deliver configuration data to the image forming apparatus 101. Accordingly, the above-described virtual configuration data receiving unit 303 accesses the above-described address.

The virtual configuration data has a data configuration similar to that of the actual configuration data illustrated in FIGS. 4A, 4B, and 4C. Accordingly, in the following description, the actual configuration data illustrated in FIGS. 4A, 4B, and 4C may be referred to as virtual configuration data.

Referring back to FIG. 3, the actual device configuration data collecting unit 304 can collect device configuration data (actual device configuration data) of the image forming apparatus 101.

Figure 5A:
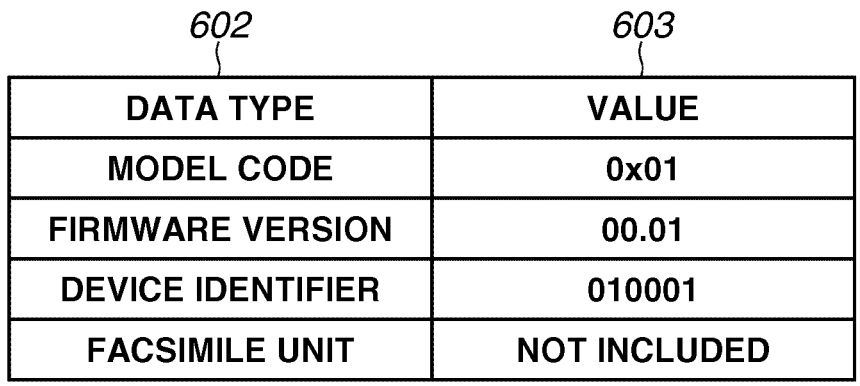
FIGS. 5A, 5B, and 5C illustrate examples of actual device configuration data.
Figure 5B:
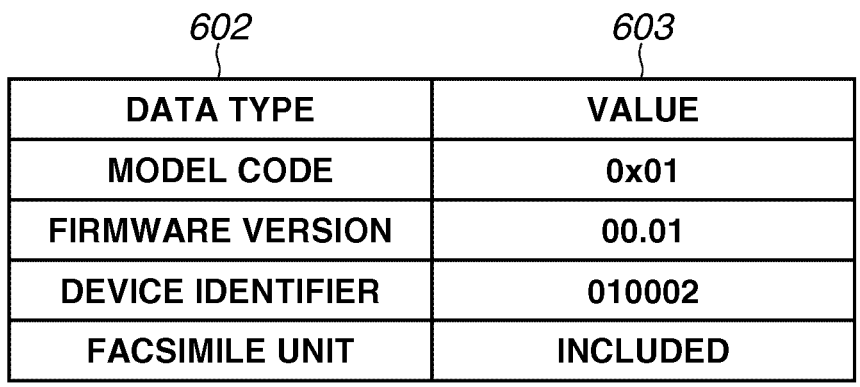
Figure 5C:
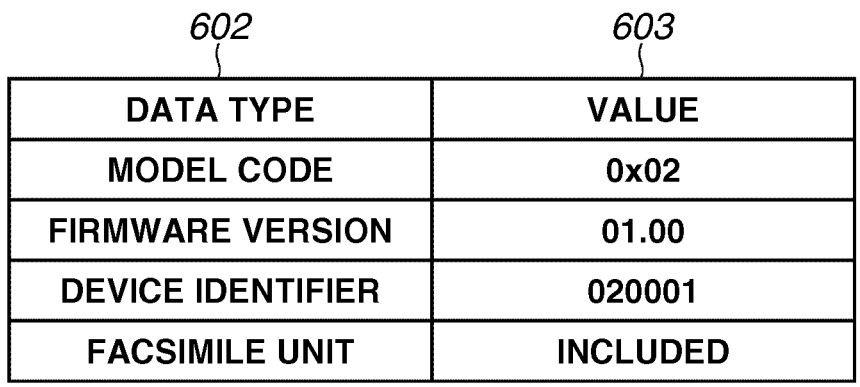

FIGS. 5A, 5B, and 5C illustrate examples of the actual device configuration data of different image forming apparatuses. The actual device configuration data includes data items of data type 602 and value 603.

The data type 602 indicates the type of data, which is included in the actual device configuration data. The data type 602 includes setting items of model code (identifying each model), firmware version, and device identifier (identifying each device). The value 603 indicates a setting value of each data. The value 603 includes setting values (e.g., the value of the device identifier or the presence of the facsimile unit) that correspond to the setting items of the data type 602.

The virtual device configuration data has a data configuration similar to that of the actual device configuration data. Accordingly, the actual device configuration data illustrated in FIGS. 5A, 5B, and 5C may be referred to as virtual device configuration data.

The tenant identifier holding unit 305 can hold a tenant identifier (i.e., an identifier of a tenant to which the image forming apparatus 101 belongs). The tenant identifier can be set in the initial setup of the image forming apparatus 101 and can be stored in the auxiliary storage apparatus 204A. The stored tenant identifier is not erased even when the power source is turned off.

The actual device configuration data notifying unit 306 can send a notification including the actual device configuration data collected by the actual device configuration data collecting unit 304 and the tenant identifier stored in the tenant identifier holding unit 305 to an actual device configuration data receiving unit 318 of the setting value management service 310. More specifically, the actual device configuration data notifying unit 306 transmits a configuration data generation request including the actual device configuration data and the tenant identifier to the actual device configuration data receiving unit 318. The configuration data generation request is a request requiring generation of virtual configuration data that corresponds to the image forming apparatus 101 (i.e., an operation setting generation request).

The data deleting unit 391 can delete data relating to the image forming apparatus 101. For example, the data deleting unit 391 deletes the actual configuration data and the tenant identifier stored in the image forming apparatus 101 according to a user operation, for example, in the process of abandoning the image forming apparatus 101.

The data deleting unit 391 can perform the following processing after completing the data deletion processing for the image forming apparatus 101. The data deleting unit 391 instructs a data deleting unit 393 included in the setting value management service 310 to delete management data relating to the image forming apparatus 101. Namely, the data deleting unit 391 instructs the data deleting unit 393 to perform data deletion processing via the Internet 104.

Further, the data deleting unit 391 can receive a data deletion instruction from the data deleting unit 393 of the setting value management service 310, and can delete the data relating to the image forming apparatus 101 according to the received data deletion instruction. Further, the data deleting unit 391 can receive a data deletion instruction from a data deleting unit 395 of the contract management service 1101, according to the received data deletion instruction, and can delete the data relating to the image forming apparatus 101.

The data encrypting and retreating unit 392 can retreat data relating to the image forming apparatus 101. For example, the data encrypting and retreating unit 392 encrypts and retreats the actual configuration data and the tenant identifier stored in the image forming apparatus 101 according to a user operation, when the image forming apparatus 101 performs restoration processing.

The data encrypting and retreating unit 392 can perform the following processing after completing the processing of retreating the data relating to the image forming apparatus 101. The data encrypting and retreating unit 392 instructs a data encrypting and retreating unit 394 included in the setting value management service 310 to retreat the management data relating to the image forming apparatus 101. Namely, the data encrypting and retreating unit 392 instructs the data encrypting and retreating unit 394 to perform data retreat processing via the Internet 104.

Further, the data encrypting and retreating unit 392 can receive a data retreat instruction from the data encrypting and retreating unit 394 of the setting value management service 310 and can retreat the data relating to the image forming apparatus 101 according to the received data retreat instruction. Further, the data encrypting and retreating unit 392 can receive a data retreat instruction from a data encrypting and retreating unit 396 of the contract management service 1101 and can retreat the data relating to the image forming apparatus 101 according to the received data retreat instruction.

More specifically, the data deleting unit 391 and the data encrypting and retreating unit 392 are functionally operable as a first retreat/deletion processing unit configured to perform the following processing. The first retreat/deletion processing unit performs retreat processing for encrypting and retreating the data relating to the image forming apparatus 101, including at least the configuration data or performs deletion processing for deleting the data relating to the image forming apparatus 101.

The contract management service 1101 is functionally operable as a management apparatus configured to manage contract information (contract data) relating to the image forming apparatus 101. The contract management service 1101 includes, at least the data deleting unit 395 and the data encrypting and retreating unit 396.

The data deleting unit 395 can delete the contract data of the image forming apparatus 101, which is held by the contract management service 1101. For example, the data deleting unit 395 receives a data deletion instruction from the data deleting unit 393 of the setting value management service 310 and deletes the contract data of the image forming apparatus 101 according to the received data deletion instruction. Further, for example, the data deleting unit 395 deletes the contract data of the image forming apparatus 101 when the image forming apparatus 101 performs restoration processing.

The data deleting unit 395 performs the following processing via the Internet 104 after completing the contract data deletion processing for the image forming apparatus 101. The data deleting unit 395 instructs the data deleting unit 391 included in the image forming apparatus 101 to delete the data relating to the image forming apparatus 101. Namely, the data deleting unit 395 instructs the data deleting unit 391 to perform data deletion processing.

The data encrypting and retreating unit 396 can retreat the contract data of the image forming apparatus 101. For example, the data deleting unit 395 receives a data retreat instruction from the data encrypting and retreating unit 394 of the setting value management service 310 and retreats the contract data of the image forming apparatus 101 according to the received data retreat instruction. Further, for example, the data encrypting and retreating unit 396 retreats the contract data of the image forming apparatus 101 when the image forming apparatus 101 performs restoration processing.

The data encrypting and retreating unit 396 performs the following processing via the Internet 104 after completing the contract data retreat processing for the image forming apparatus 101. The data encrypting and retreating unit 396 instructs the data encrypting and retreating unit 392 included in the image forming apparatus 101 to retreat the data relating to the image forming apparatus 101. Namely, the data encrypting and retreating unit 396 instructs the data encrypting and retreating unit 392 to perform data retreat processing.

FIG. 3 illustrates the data deleting unit 395 and the data encrypting and retreating unit 396 that serve as processing units of the contract management service 1101. However, the contract management service 1101 can further include a predetermined processing unit configured to manage the contract information (e.g., a contract data holding unit 1105 illustrated in illustrated in FIG. 11).

More specifically, the data deleting unit 395 and the data encrypting and retreating unit 396 are functionally operable as a third retreat/deletion processing unit configured to perform retreat processing for encrypting and retreating the contract information of the image forming apparatus 101 or perform deletion processing for deleting the contract information of the image forming apparatus.

The setting value management service 310 is functionally operable as a management apparatus that can manage the configuration data of the image forming apparatus. The setting value management service 310 can be provided by the server computer group 105.

The setting value management service 310 includes a virtual device holding unit 311, a model-dependent setting value schema holding unit 312, a model-dependent setting value schema updating unit 313, a tenant-oriented configuration data holding unit 314, and a tenant-oriented configuration data updating unit 315. Further, the setting value management service 310 includes a virtual configuration data generating unit 316, a virtual configuration data updating unit 317, the actual device configuration data receiving unit 318, a virtual device configuration data updating unit 319, and the virtual configuration data acquiring unit 320. Further, the setting value management service 310 includes a virtual configuration data browsing unit 321, a virtual configuration data update confirming unit 322, the data deleting unit 393, and the data encrypting and retreating unit 394.

The virtual device holding unit 311 can hold virtual devices. The virtual device includes, at least, virtual device configuration data, virtual configuration data, a virtual device identifier, and a tenant identifier. The virtual device holding unit 311 stores the virtual devices in the auxiliary storage apparatus 204C and manages the stored virtual devices.

FIG. 6 illustrates an example of virtual devices. Each virtual device illustrated in FIG. 6 includes device identifier 802, tenant identifier 803, virtual device configuration data 804, virtual configuration data 805, and notification flag 806. The device identifier 802 is identification information that can uniquely identify each virtual device. The device identifier 802 corresponds to identification information that can uniquely identify the image forming apparatus 101 that corresponds to the virtual device. The device identifier 802 is included in the device configuration data notified from the image forming apparatus 101 to the setting value management service 310.

The tenant identifier 803 is identification information that can uniquely identify a tenant to which the image forming apparatus 101 belongs, which corresponds to the virtual device. The virtual device configuration data 804 is identification information that can uniquely identify the virtual device configuration data. The virtual device configuration data corresponds to the device configuration data (actual device configuration data) of the image forming apparatus 101 that corresponds to the virtual device. The virtual configuration data 805 is identification information that can uniquely identify the virtual configuration data. The virtual configuration data corresponds to the configuration data (actual configuration data) of the image forming apparatus 101 that corresponds to the virtual device.

The notification flag 806 indicates whether the virtual configuration data 805 is already notified or not yet notified to the image forming apparatus. When the setting value in the notification flag 806 is "NOT COMPLETED", it indicates that the virtual configuration data 805 is not yet notified to the image forming apparatus. When the setting value in the notification flag 806 is "COMPLETED", it indicates that the virtual configuration data 805 is already notified to the image forming apparatus.

When the virtual configuration data update processing is completed, the virtual configuration data acquiring unit 320 acquires the virtual configuration data and sends the acquired virtual configuration data to the image forming apparatus 101. Accordingly, when the virtual configuration data updating unit 317 updates the virtual configuration data, the virtual configuration data updating unit 317 sets "NOT COMPLETED" to the notification flag 806 that corresponds to the virtual configuration data.

Further, for example, when the virtual configuration data acquiring unit 320 acquires the virtual configuration data, the virtual configuration data acquiring unit 320 sets "COMPLETED" to the notification flag 806 that corresponds to the virtual configuration data.

Referring back to FIG. 3, the model-dependent setting value schema holding unit 312 can hold model-dependent setting value schemata. One model-dependent setting value schema is prepared for each model of the image forming apparatus.

FIGS. 7A and 7B illustrate examples of the model-dependent setting value schema. FIG. 7A illustrates a model-dependent setting value schema that corresponds to a model having a model code "0x01." FIG. 7B illustrates a model-dependent setting value schema that corresponds to a model having a model code "0x02." The model-dependent setting value schema includes data items of setting value identifier 402, default value 403, value range 404, and condition 405.

The setting value identifier 402 is identification information that can uniquely identify each setting item. For example, "copy_settings.nup" indicates a setting item relating to the imposition included in copy_settings. When the setting value identifier 402 is the same, it means that the same setting items are applied even when the model is different. The default value 403 is a default setting value for each model.

The value range 404 defines the range of setting value for each model. For example, the value range 404 of the setting value identifier "copy_settings.nup" is "1 in 1, 2 in 1, and 4 in 1", it means that one of 1 in 1, 2 in 1, and 4 in 1 is selectable for the copy_settings.

The condition 405 defines a condition required to use the setting value for each model. The condition 405 corresponding to a setting value identifier "fax_settings.received_print" is "facsimile unit", it means that the setting value of the setting item is valid only when installation of a facsimile unit is confirmed.

Referring back to FIG. 3, the model-dependent setting value schema updating unit 313 can update each model-dependent setting value schema held by the model-dependent setting value schema holding unit 312. For example, if a new model of the image forming apparatus is announced by its vendor, a model-dependent setting value schema that corresponds to the new model is registered in response to an instruction from an administrator of the vendor. Further, if there is any change in the setting items, the model-dependent setting value schema updating unit 313 updates the model-dependent setting value schema.

The tenant-oriented configuration data holding unit 314 can hold configuration data that each tenant wants to set for the image forming apparatus.

Figure 8:
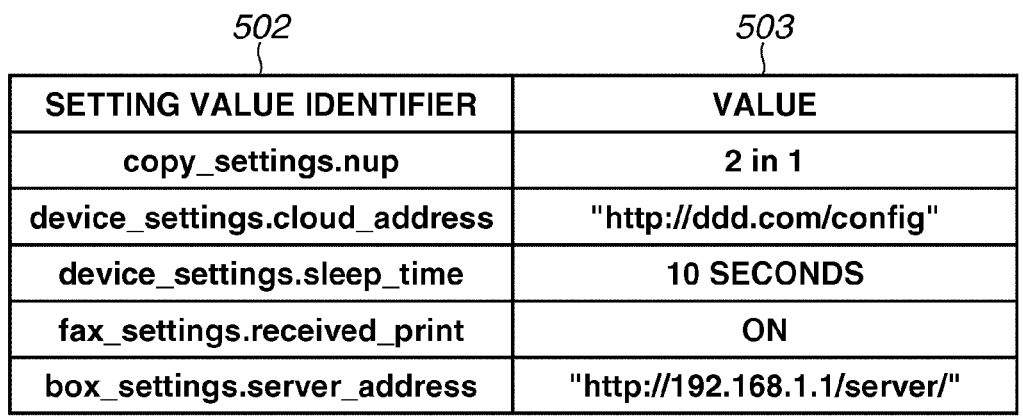
FIG. 8 illustrates an example of tenant-oriented configuration data.

FIG. 8 illustrates an example of the tenant-oriented configuration data. The tenant-oriented configuration data includes data items of setting value identifier 502 and value 503. The setting value identifier 502 is similar to the setting value identifier 402 included in the model-dependent setting value schema illustrated in FIGS. 7A and 7B. The value 503 is a common setting value desired for the tenant. More specifically, the value 503 having been set for the setting value identifier "copy_settings.nup" is "2 in 1", which means that the tenant desires that the imposition "2 in 1" is set for all of the image forming apparatuses held by the tenant.

Referring back to FIG. 3, the tenant-oriented configuration data updating unit 315 can update the tenant-oriented configuration data held by the tenant-oriented configuration data holding unit 314. The terminal device 102B existing in the service engineer environment 110 instructs updating the tenant-oriented configuration data according to an operation of a service engineer who manages an image forming apparatus held by the tenant.

The tenant-oriented configuration data updating unit 315 updates the tenant-oriented configuration data according to the update instruction. In this case, the service engineer can perform the operation using a setting screen that is displayed when a web browser is launched on the terminal device 102B.

The virtual configuration data generating unit 316 can generate virtual configuration data based on the model-dependent setting value schema, the tenant-oriented configuration data, and the virtual device configuration data. First, the virtual configuration data generating unit 316 acquires the virtual device configuration data illustrated in FIG. 5A from the virtual device holding unit 311.

Next, the virtual configuration data generating unit 316 identifies the model of the image forming apparatus with reference to a model code included in the acquired virtual device configuration data. According to the virtual device configuration data illustrated in FIG. 5A, the setting value that corresponds to the model code is 0x01. Accordingly, the virtual configuration data generating unit 316 determines that the image forming apparatus to be identified is the model having the model code "0x01."

Next, the virtual configuration data generating unit 316 acquires the model-dependent setting value schema that corresponds to the identified model code from the model-dependent setting value schema holding unit 312. For example, the virtual configuration data generating unit 316 acquires the model-dependent setting value schema illustrated in FIG. 7A, which coincides with the model code "0x01."

Next, the virtual configuration data generating unit 316 designates setting values defined in the acquired model-dependent setting value schema as basic virtual configuration data. According to the model-dependent setting value schema illustrated in FIG. 7A, the virtual configuration data generating unit 316 designates basic setting values that correspond to five setting items of "copy_settings.nup" through "box_settings.server_address."

Next, the virtual configuration data generating unit 316 acquires the tenant-oriented configuration data illustrated in FIG. 8 from the tenant-oriented configuration data holding unit 314. The virtual configuration data generating unit 316 determines whether the setting value included in the tenant-oriented configuration data is present in the value range defined in the model-dependent setting value schema.

According to the tenant-oriented configuration data illustrated in FIG. 8 and the model-dependent setting value schema illustrated in FIG. 7A, the value (i.e., setting value) of the setting item "copy_settings.nup" included in the tenant-oriented configuration data is "2 in 1." The value range that corresponds to the above-described setting item, which is defined in the model-dependent setting value schema, is "1 in 1, 2 in 1, and 4 in 1." Accordingly, the setting value included in the tenant-oriented configuration data is present in the value range defined in the model-dependent setting value schema.

The value (i.e., setting value) of the setting item "device_settings.sleep_time" included in the tenant-oriented configuration data is "10 seconds." On the other hand, the value range that corresponds to the above-described setting item, which is defined in the model-dependent setting value schema, is "one minute, ten minutes, and one hour." Accordingly, the setting value included in the tenant-oriented configuration data is not present in the value range defined in the model-dependent setting value schema.

When the setting value included in the tenant-oriented configuration data is not present in the value range defined in the model-dependent setting value schema, the virtual configuration data generating unit 316 acquires a default value defined in the model-dependent setting value schema. According to the above-described example, the virtual configuration data generating unit 316 acquires the default value "ten minutes." The virtual configuration data generating unit 316 uses the acquired default value as a setting value of the above-described setting item, in the virtual configuration data.

When the setting value included in the tenant-oriented configuration data is present in the value range defined in the model-dependent setting value schema, the virtual configuration data generating unit 316 designates the setting value included in the tenant-oriented configuration data as a setting value that corresponds to the above-described setting item of the virtual configuration data.

Next, the virtual configuration data generating unit 316 determines whether the virtual device configuration data satisfies the condition defined in the model-dependent setting value schema. According to the model-dependent setting value schema illustrated in FIG. 7A, there is not any condition to be satisfied for the setting item "copy_settings.nup." Accordingly, the virtual device configuration data illustrated in FIG. 5A satisfies the condition that corresponds to the setting item "copy_settings.nup."

However, the condition that corresponds to the setting item "fax_settings.received_print" is "facsimile unit." The setting value of the "facsimile unit" included in the device configuration data is "nothing." Accordingly, the virtual device configuration data does not satisfy the condition that corresponds to the above-described setting item.

When the virtual device configuration data does not satisfy the condition defined in the model-dependent setting value schema, the virtual configuration data generating unit 316 acquires a default value defined in the model-dependent setting value schema 403. According to the above-described example, the virtual configuration data generating unit 316 acquires the default value "OFF" that corresponds to the setting item "fax_settings.received_print." The virtual configuration data generating unit 316 uses the acquired default value as a setting value of the above-described setting item, in the virtual configuration data.

Referring back to FIG. 3, the virtual configuration data updating unit 317 updates the virtual configuration data of the virtual device held by the virtual device holding unit 311 based on the virtual configuration data generated by the virtual configuration data generating unit 316.

More specifically, the virtual configuration data updating unit 317 acquires a virtual device having a device identifier that corresponds to the generated virtual configuration data, which is one of the virtual devices held by the virtual device holding unit 311. Then, the virtual configuration data updating unit 317 updates the virtual configuration data of the acquired virtual device based on the generated virtual configuration data.

Further, if the notification flag 806 of the virtual device is "COMPLETED", the virtual configuration data updating unit 317 changes the setting value to "NOT COMPLETED." When the setting value of the notification flag 806 is "COMPLETED", it means that there is a change in the virtual configuration data that corresponds to the image forming apparatus and it is necessary for the image forming apparatus to refer to new virtual configuration data.

The actual device configuration data receiving unit 318 receives the device configuration data (FIGS. 5A, 5B, and 5C) and the tenant identifier from the actual device configuration data notifying unit 306 included in the image forming apparatus 101. The virtual device configuration data updating unit 319 updates the virtual device configuration data of the virtual device held by the virtual device holding unit 311 based on the device configuration data received by the actual device configuration data receiving unit 318.

More specifically, the virtual device configuration data updating unit 319 acquires a virtual device having a device identifier having been set in the device configuration data received by the actual device configuration data receiving unit 318, which is one of the virtual devices held by the virtual device holding unit 311. Then, the virtual device configuration data updating unit 319 updates the virtual device configuration data of the acquired virtual device based on the device configuration data received by the actual device configuration data receiving unit 318.

The virtual configuration data acquiring unit 320 can receive the virtual configuration data acquisition request, via the Internet 104, from the virtual configuration data receiving unit 303 included in the image forming apparatus 101. The virtual configuration data acquiring unit 320 can acquire virtual configuration data from the virtual device holding unit 311.

The virtual configuration data acquisition request includes, at least, the device identifier that can identify each virtual device. Accordingly, the virtual configuration data acquiring unit 320 searches for a virtual device that has the device identifier included in the virtual configuration data acquisition request. The virtual configuration data acquiring unit 320 acquires virtual configuration data of the identified virtual device. Then, the virtual configuration data acquiring unit 320 sends the acquired virtual configuration data, via the Internet 104, to a request source (more specifically, the virtual configuration data receiving unit 303).

The virtual configuration data browsing unit 321 can receive a configuration data browsing request, via the Internet 104, from an external apparatus. The configuration data browsing request is an HTTP protocol request. The virtual configuration data browsing unit 321 acquires virtual configuration data that corresponds to the browsing request and generates an HTML page that is usable to browse the acquired virtual configuration data. Then, the virtual configuration data browsing unit 321 sends the generated HTML page to the request source.

The virtual configuration data update confirming unit 322 can confirm whether the virtual configuration data is updated. More specifically, the virtual configuration data receiving unit 303 included in the image forming apparatus 101 transmits the device identifier of the image forming apparatus 101, via the Internet 104, to the virtual configuration data update confirming unit 322. The virtual configuration data update confirming unit 322 searches for a virtual device (i.e., one of the virtual devices held by the virtual device holding unit 311) that coincides with the received device identifier.

The virtual configuration data update confirming unit 322 refers to the notification flag 806 of the identified virtual device. If the notification flag 806 is "NOT COMPLETED", the virtual configuration data update confirming unit 322 determines that the virtual configuration data has been updated. If the notification flag 806 is "COMPLETED", the virtual configuration data update confirming unit 322 determines that the virtual configuration data is not yet updated.

The virtual configuration data update confirming unit 322 sends a reply indicating whether the virtual configuration data has been updated to the virtual configuration data receiving unit 303. When the virtual configuration data receiving unit 303 has confirmed that the virtual configuration data has been updated, the virtual configuration data receiving unit 303 sends a configuration data acquisition request to the virtual configuration data acquiring unit 320 of the setting value management service 310.

For example, in response to the update of the virtual configuration data by the virtual configuration data updating unit 317, the virtual configuration data update confirming unit 322 may confirm that the virtual configuration data has been updated. In this case, after the virtual configuration data update confirming unit 322 has confirmed the update of the virtual configuration data, the virtual configuration data acquiring unit 320 may acquire the configuration data and transmit the acquired configuration data to the virtual configuration data of the image forming apparatus 101.

The data deleting unit 393 can receive a data deletion instruction from the data deleting unit 391 of the image forming apparatus 101, and can delete the management data relating to the image forming apparatus 101 according to the received instruction. The management data relating to the image forming apparatus 101 includes, at least, data relating to the configuration data management of the image forming apparatus 101.

The data deleting unit 393 performs the following processing after completing the management data deletion processing for the image forming apparatus 101. The data deleting unit 393 instructs the data deleting unit 395 included in the contract management service 1101 to perform contract data deletion processing for the image forming apparatus 101. Namely, the data deleting unit 393 instructs the data deleting unit 395 to perform data deletion processing via the Internet 104.

The data encrypting and retreating unit 394 receives a data retreat instruction from the data encrypting and retreating unit 392 of the image forming apparatus 101 and retreat the management data relating to the image forming apparatus 101 according to the received instruction. The data encrypting and retreating unit 394 performs the following processing after completing the management data retreat processing for the image forming apparatus 101.

The data encrypting and retreating unit 394 instructs the data encrypting and retreating unit 396 included in the contract management service 1101 to retreat the contract data of the image forming apparatus 101. Namely, the data encrypting and retreating unit 394 instructs the data encrypting and retreating unit 396 to perform data retreat processing via the Internet 104.

More specifically, the data deleting unit 393 and the data encrypting and retreating unit 394 are functionally operable as a second retreat/deletion processing unit configured to perform the following processing. The second retreat/deletion processing unit can perform retreat processing for encrypting and retreating the management data relating to the image forming apparatus, including at least data relating to the management of the operational setting information, or can perform deletion processing for deleting the management data relating to the image forming apparatus.

Figure 9:
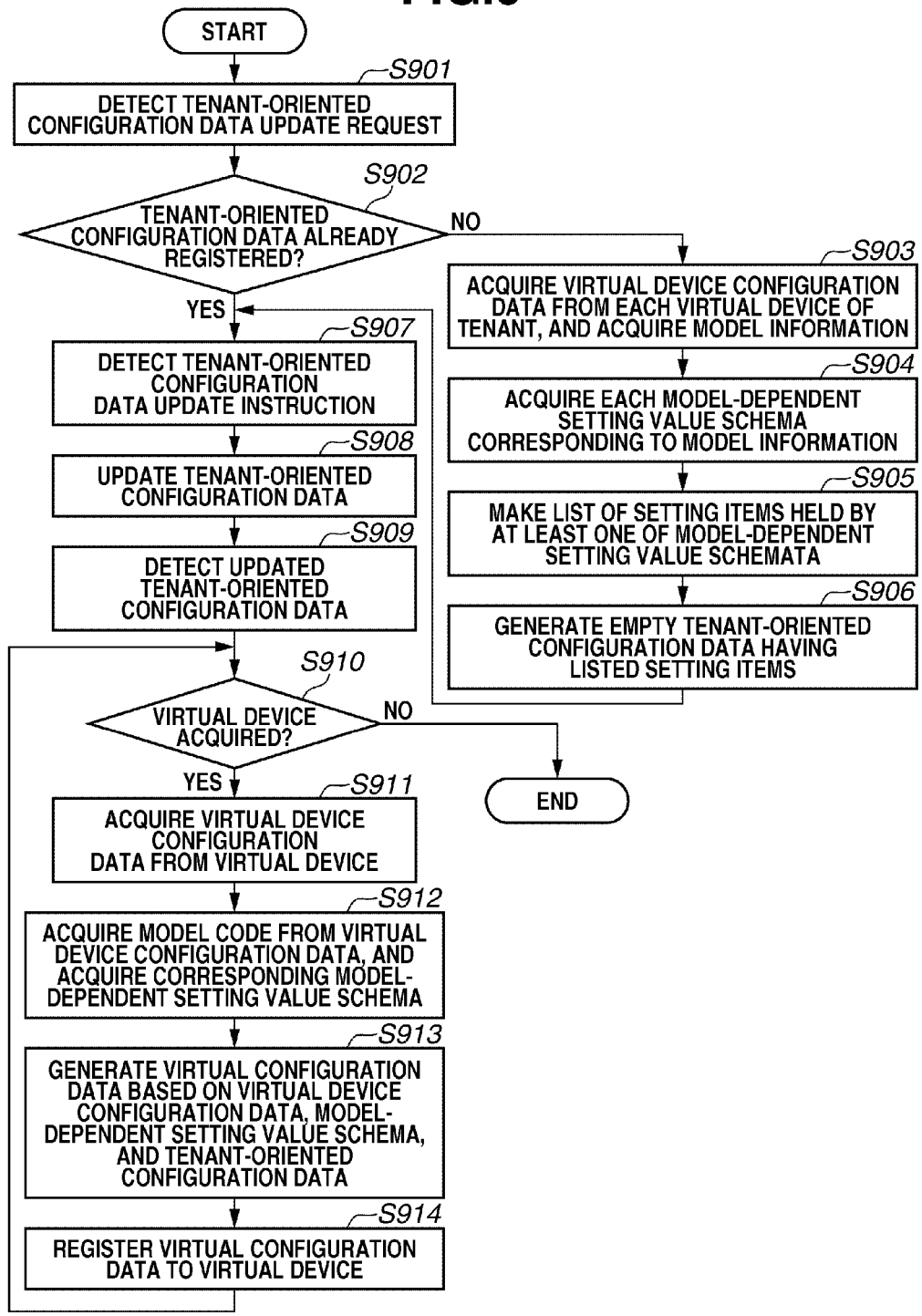
FIG. 9 is an example flowchart illustrating tenant-oriented configuration data updating processing according to an exemplary embodiment of the present invention.

FIG. 9 is an example flowchart illustrating tenant-oriented configuration data updating processing. According to the above-described example, an administrator user updates the tenant-oriented configuration data using the terminal device 102A. A computer program that can realize the processing in each step of the flowchart is stored in any one of storage areas of the nonvolatile memory 202C, the volatile memory 203C, and the auxiliary storage apparatus 204C, and can be executed by the CPU 201C.

First, in step S901, the tenant-oriented configuration data updating unit 315 detects a tenant-oriented configuration data update request transmitted from the terminal device 102A. Next, in step S902, the tenant-oriented configuration data updating unit 315 causes the tenant-oriented configuration data holding unit 314 to confirm whether tenant-oriented configuration data that corresponds to the tenant-oriented configuration data update request has already been registered.

If it is determined that the tenant-oriented configuration data that corresponds to the tenant-oriented configuration data update request has already been registered (YES in step S902), the processing proceeds to step S907. If it is determined that the tenant-oriented configuration data that corresponds to the tenant-oriented configuration data update request is not yet registered (NO in step S902), the processing proceeds to step S903.

In step S903, the tenant-oriented configuration data updating unit 315 acquires each virtual device held by the tenant from the virtual device holding unit 311. The tenant-oriented configuration data updating unit 315 acquires virtual device configuration data of the acquired virtual device. Further, in step S903, the tenant-oriented configuration data updating unit 315 acquires a model code (i.e., model information) included in the acquired virtual device configuration data.

Next, in step S904, the tenant-oriented configuration data updating unit 315 acquires each model-dependent setting value schema that corresponds to the acquired model code from the model-dependent setting value schema holding unit 312. Subsequently, in step S905, the tenant-oriented configuration data updating unit 315 makes a list of setting items held by at least one of the model-dependent setting value schemata acquired in step S904.

Then, in step S906, the tenant-oriented configuration data updating unit 315 generates empty tenant-oriented configuration data having the setting items listed in step S905. Subsequently, the processing proceeds to step S907.

In step S907, the tenant-oriented configuration data updating unit 315 detects a tenant-oriented configuration data update instruction. Then, in step S908, the tenant-oriented configuration data updating unit 315 updates the tenant-oriented configuration data based on the update instruction detected in step 907. The tenant-oriented configuration data holding unit 314 stores the updated tenant-oriented configuration data.

Next, in step S909, the virtual configuration data generating unit 316 detects that the tenant-oriented configuration data has been updated. Then, the virtual configuration data generating unit 316 searches for a virtual device that coincides with a tenant identifier included in the update confirmed tenant-oriented configuration data, from the virtual device held by the virtual device holding unit 311. To perform sequential processing on each identified virtual device, the virtual configuration data generating unit 316 acquires one virtual device.

In step S910, the virtual configuration data generating unit 316 determines whether the virtual device has been acquired. The sequential processing is performed for all of the identified virtual devices. If the next virtual device to be processed cannot be acquired (NO in step S910), the virtual configuration data generating unit 316 terminates the processing of the flowchart illustrated in FIG. 9. If the virtual configuration data generating unit 316 has acquired the next virtual device (YES in step S910), the processing proceeds to step S911.

In step S911, the virtual configuration data generating unit 316 acquires virtual device configuration data from a processing target virtual device. Subsequently, the virtual configuration data generating unit 316 acquires a model code from the virtual device configuration data acquired in step S911. Then, in step S912, the virtual configuration data generating unit 316 acquires a model-dependent setting value schema that corresponds to the acquired model code from the model-dependent setting value schema holding unit 312.

Next, in step S913, the virtual configuration data generating unit 316 generates virtual configuration data based on the virtual device configuration data, the model-dependent setting value schema, and the tenant-oriented configuration data. In step S914, the virtual configuration data updating unit 317 registers the generated virtual configuration data to the virtual device. Then, the processing returns to step S910. Through the processing in step S914, the updated tenant-oriented configuration data can be reflected in the virtual configuration data.

Figure 10:
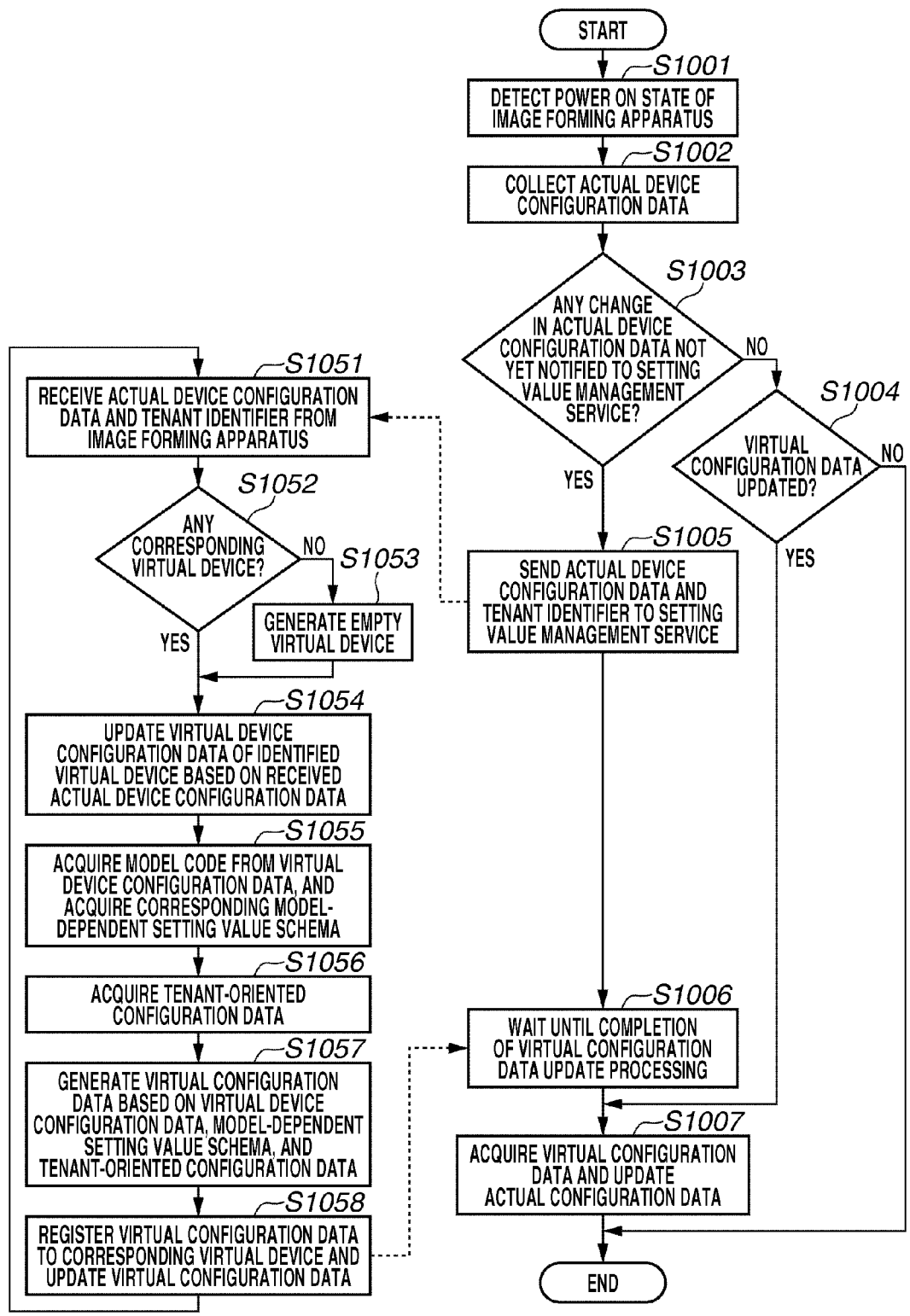
FIG. 10 is an example flowchart illustrating virtual configuration data acquisition processing according to an exemplary embodiment of the present invention.

FIG. 10 is an example flowchart illustrating virtual configuration data acquisition processing that can be performed by the image forming apparatus 101 and the server computer group 105.

Processing in steps S1001 through S1007 illustrated in FIG. 10 can be executed by the image forming apparatus 101. A computer program that can realize the processing in these steps is stored in any one of the storage areas of the nonvolatile memory 202A, the volatile memory 203A, and the auxiliary storage apparatus 204A and can be executed by the CPU 201A.

Further, processing in steps S1051 through S1058 can be executed by the server computer group 105. A computer program that can realize these steps is stored in any one of the storage areas of the nonvolatile memory 202C, the volatile memory 203C, and the auxiliary storage apparatus 204C and can be executed by the CPU 201C.

First, in step S1001, the actual device configuration data notifying unit 306 of the image forming apparatus 101 detects a power ON state of the image forming apparatus 101. Subsequently, in step S1002, the actual device configuration data collecting unit 304 collects actual device configuration data.

The actual device configuration data notifying unit 306 is functionally operable as a configuration change determination unit configured to determine whether there is any change in the device configuration information included in the image forming apparatus 101. More specifically, in step S1003, the actual device configuration data notifying unit 306 determines whether there is any change in actual device configuration data that is not yet notified to the setting value management service 310, based on the actual device configuration data collected in step S1002.

If it is determined that there is a change in the non-notified actual device configuration data (YES in step S1003), the processing proceeds to step S1005. If it is determined that there is not any change in the non-notified actual device configuration data (NO in step S1003), the processing proceeds to step S1004. If the device is a newly installed device, the processing proceeds to step S1005.

In step S1004, the virtual configuration data receiving unit 303 determines whether the device has already acquired the latest virtual configuration data. More specifically, the virtual configuration data receiving unit 303 determines whether the virtual configuration data has been updated. More specifically, via the Internet 104, the virtual configuration data receiving unit 303 causes the virtual configuration data update confirming unit 322 of the setting value management service 310 to confirm if the virtual configuration data has been updated.

The virtual configuration data receiving unit 303 determines whether the virtual configuration data has been updated based on the above-described confirmation result. If it is determined that the virtual configuration data is not yet updated (NO in step S1004), the image forming apparatus 101 terminates the processing of the flowchart illustrated in FIG. 10. If it is determined that the virtual configuration data has been updated (YES in step S1004), the processing proceeds to step S1007.

In step S1005, the actual device configuration data notifying unit 306 sends a configuration data generation request that includes the actual device configuration data and the tenant identifier to the setting value management service 310. More specifically, if it is determined that there is a change in configuration information, the actual device configuration data notifying unit 306 is functionally operable as a request unit configured to transmit a configuration data generation request that includes the changed configuration information and information relating to a unit of management (e.g., the tenant identifier) that corresponds to the image forming apparatus. A notification destination address is an address held by the actual configuration data holding unit 301.

In step S1051, the setting value management service 310 detects the above-described notification and performs processing as described in detail below.

Next, in step S1006, the virtual configuration data receiving unit 303 interrupts its processing until the virtual configuration data update processing completes. Subsequently, the virtual configuration data receiving unit 303 receives the virtual configuration data from the setting value management service 310.

More specifically, the virtual configuration data receiving unit 303 is functionally operable as an acquiring unit configured to acquire operational setting information that corresponds to the image forming apparatus 101 from the setting value management service 310 that has generated (updated) the virtual configuration data according to the configuration data generation request. Then, in step S1007, the virtual configuration data updating unit 317 updates the received virtual configuration data as actual configuration data. The updated actual configuration data is stored in the actual configuration data holding unit 301.

In step S1051, the actual device configuration data receiving unit 318 of the setting value management service 310 is functionally operable as a request receiving unit configured to receive a configuration data generation request that includes the actual device configuration data and the tenant identifier from the image forming apparatus 101.

Next, in step S1052, the virtual device configuration data updating unit 319 searches for a virtual device (i.e., one of the virtual devices held by the virtual device holding unit 311) that coincides with the actual device configuration data and the tenant identifier included in the configuration data generation request received in step S1051.

If there is an identified virtual device (YES in step S1052), the processing proceeds to step S1054. If there is not any identified virtual device (NO in step S1052), the processing proceeds to step S1053. For example, no virtual device can be identified when the image forming apparatus first communicates with the setting value management service 310, for example, if the device is a newly installed device. Accordingly, in this case, the processing proceeds to step S1053.

In step S1053, the virtual device configuration data updating unit 319 generates an empty virtual device. Then, the processing proceeds to step S1054. Subsequently, in step S1054, the virtual device configuration data updating unit 319 updates the virtual device configuration data of the virtual device identified in step S1052 based on the actual device configuration data included in the configuration data generation request received in step S1051.

Further, the virtual device configuration data updating unit 319 sets the actual device configuration data included in the configuration data generation request received in step S1051 as virtual device configuration data of the virtual device generated in step S1053. Through the above-described processing, the virtual device that corresponds to the image forming apparatus 101 can be updated.

Next, in step S1055, the virtual configuration data generating unit 316 acquires a model code from the virtual device configuration data updated in step S1054. Then, the virtual configuration data generating unit 316 acquires a model-dependent setting value schema that corresponds to the acquired model code from the model-dependent setting value schema holding unit 312.

Next, in step S1056, the virtual configuration data generating unit 316 acquires tenant-oriented configuration data. More specifically, the virtual configuration data generating unit 316 acquires tenant-oriented configuration data (i.e., tenant-oriented configuration data held by the tenant-oriented configuration data holding unit 314) that corresponds to the tenant identifier received in step S1051.

Next, in step S1057, the virtual configuration data generating unit 316 generates virtual configuration data based on the virtual device configuration data, the model-dependent setting value schema, and the tenant-oriented configuration data. The processing to be performed in step S1057 is similar to the processing performed in step S913 illustrated in FIG. 9. More specifically, the virtual configuration data generating unit 316 is functionally operable as a generating unit configured to generate configuration data that corresponds to the image forming apparatus 101 based on the configuration information (device configuration data) included in the configuration data generation request.

Next, in step S1058, the virtual configuration data updating unit 317 registers the generated virtual configuration data to the corresponding virtual device and updates the generated virtual configuration data. Further, in step S1058, the virtual configuration data acquiring unit 320 is functionally operable as a transmitting unit configured to transmit the generated virtual configuration data to the virtual configuration data receiving unit 303 of the image forming apparatus 101.

Figure 11:
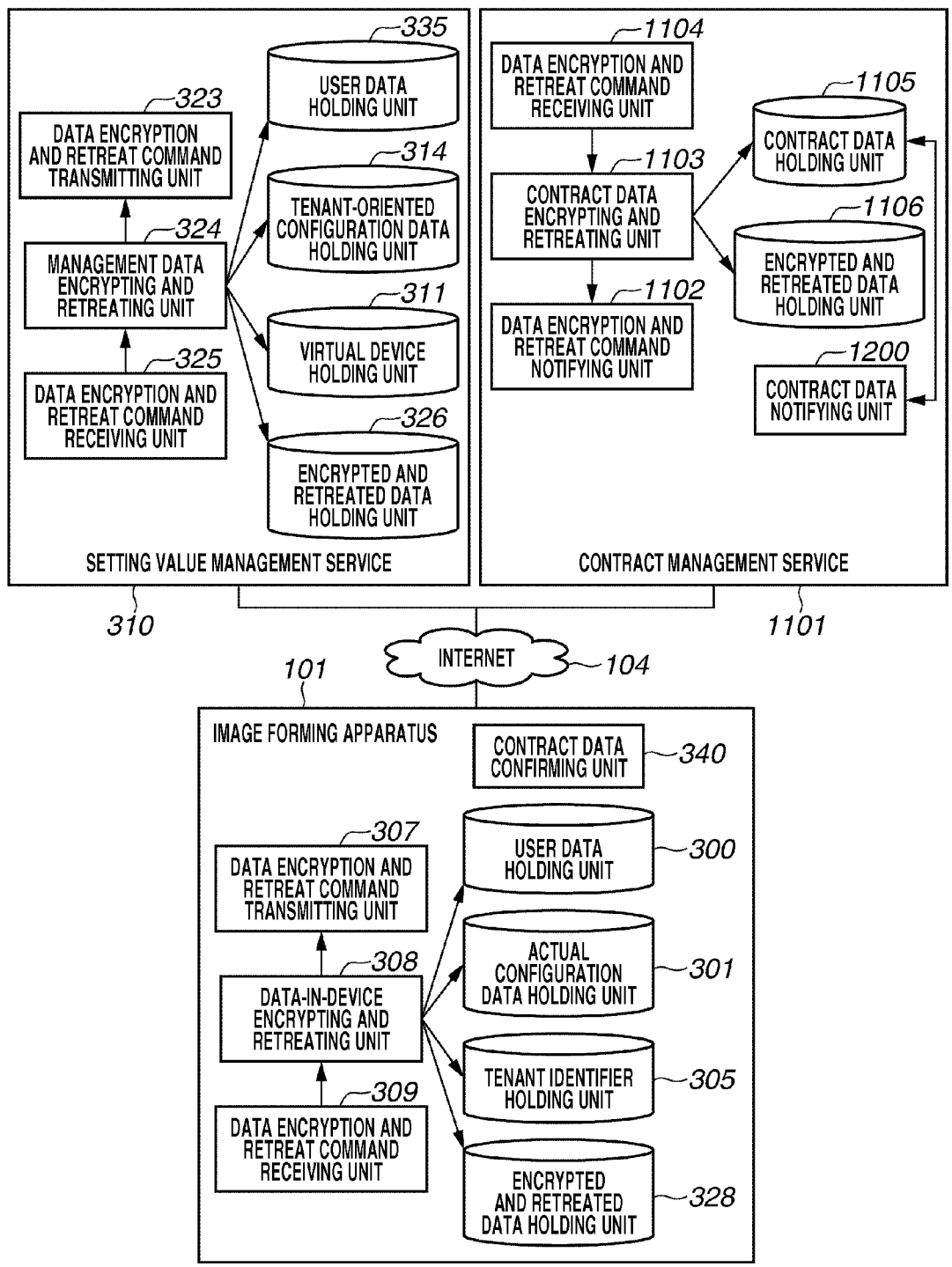
FIG. 11 is an example functional block diagram illustrating an information processing system relating to data retreat processing.

FIG. 11 is an example functional block diagram illustrating an information processing system relating to the data retreat processing. The target data to be subjected to the retreat processing of the information processing system is hereinafter referred to as retreat target data. The retreat target data that corresponds to the image forming apparatus 101, for example, includes user data to be held for each log-in user (e.g., address book), actual configuration data, and tenant identifier.

The retreat target data that corresponds to the setting value management service 310, for example, includes user data to be held for each log-in user (e.g., address book), virtual configuration data, tenant-oriented configuration data, and tenant identifier. The retreat target data that corresponds to the contract management service 1101 includes contract data. The contract data holding unit 1105 included in the contract management service 1101 holds the contract data.

FIG. 12 illustrates an example of the contract data. The contract data can be registered by the personnel in charge of service via the terminal device 102A of the service engineer environment 110 when the client makes a contract for the device.

The contract data includes device identifier 1502, tenant identifier 1503, term of contract 1504, device setting value 1505, device application 1506, life cycle 1507, device authentication key 1508, external service 1509, and retreated data 1510. The device identifier 1502 is identification information that can uniquely identify a virtual device that corresponds to the image forming apparatus 101.

The tenant identifier 1503 is identification information that can uniquely identify a tenant to which the image forming apparatus 101 corresponding to the virtual device belongs. The term of contract 1504 indicates the term of contract for the image forming apparatus 101. In the present exemplary embodiment, a party to a contract determines the term of contract when the image forming apparatus 101 is used.

The data relating to the image forming apparatus 101 whose term of contract has already expired is regarded as retreat target data and subjected to retreat processing in each of the contract management service 1101, the image forming apparatus 101, and the setting value management service 310. The device setting value 1505 is configuration data that corresponds to the image forming apparatus 101.

The device application 1506 is a character string that represents the name of the application to be executed by the image forming apparatus 101. The image forming apparatus 101 becomes feasible to execute various applications upon acquiring a required license. An application name is uniquely given to each executable application. The type of the executable application is variable depending on the type, capability, and installed license of each image forming apparatus.

The life cycle 1507 is character string data that indicates the life cycle of the image forming apparatus 101. "New operation in progress" indicates a situation that the operation is currently in progress without any recycle. Further "recycle (1) operation in progress" indicates a situation that the operation is currently in progress after one recycle.

"Restoration in progress" indicates a situation that the image forming apparatus is currently operated by no user and in a recycle stage. In the "restoration in progress" state, various data relating to the image forming apparatus are all deleted and no data remains at the termination timing of the restoration processing.

When the image forming apparatus 101 is brought into the "restoration in progress" status, for example, upon termination of the contract or interrupt, via the terminal device 102A of the service engineer environment 110, the contract data encrypting and retreating unit 1103 of the contract management service 1101 retreats the contract data relating to the image forming apparatus 101.

Further, the data encryption and retreat command notifying unit 1102 of the contract management service 1101 instructs the image forming apparatus 101 to perform retreat processing on the retreat target data. Then, the image forming apparatus 101 instructs the setting value management service 310 to perform retreat processing on the retreat target data after completing the processing for retreating the retreat target data.

The device authentication key 1508 is an authentication key that the contract management service 1101 can use in authentication of the image forming apparatus 101. The external service 1509 is an external service that is required to be cooperative to run the application on the image forming apparatus 101. The retreated data 1510 is encrypted and retreated data subjected to the retreat processing.

Referring back to FIG. 11, the image forming apparatus 101 includes a user data holding unit 300, an actual configuration data holding unit 301, a tenant identifier holding unit 305, and an encrypted and retreated data holding unit 328. Further, the image forming apparatus 101 includes a data encryption and retreat command transmitting unit 307, a data-in-device encrypting and retreating unit 308, and a data encryption and retreat command receiving unit 309.

For example, the data encryption and retreat command transmitting unit 307, the data-in-device encrypting and retreating unit 308, and the data encryption and retreat command receiving unit 309 are functionally operable as the data encrypting and retreating unit 392 illustrated in FIG. 3.

The user data holding unit 300 can hold user data that corresponds to a user of the image forming apparatus 101. The encrypted and retreated data holding unit 328 can hold the encrypted and retreated data that has been subjected to the retreat processing performed by the image forming apparatus 101.

The encrypted and retreated data holding unit 328 can store the data subjected to the retreat processing in an encrypted and retreated data storage area of the auxiliary storage apparatus 204A of the image forming apparatus 101 and can manage the stored data. In the image forming apparatus 101, the data stored in each of the user data holding unit 300, the actual configuration data holding unit 301, and the tenant identifier holding unit 305 is regarded as retreat target data.

The data-in-device encrypting and retreating unit 308 can encrypt the above-described retreat target data and can send the encrypted data to the encrypted and retreated data holding unit 328. The encrypted and retreated data holding unit 328 stores the encrypted data. The data-in-device encrypting and retreating unit 308 can obtain a 256-bit SHA256 hash value based on a device identifier character string stored in the nonvolatile memory 202A of the image forming apparatus 101 and an administrator password character string stored in the auxiliary storage apparatus 204A.

The data-in-device encrypting and retreating unit 308 designates the obtained hash value as an encryption key. The data-in-device encryption and retreat unit 308 encrypts the retreat target data using the designated encryption key according to the common key AES256 encryption method. The data-in-device encryption and retreat unit 308 compresses the encrypted data and causes the encrypted and retreated data holding unit 328 to store the compressed data.

The data encryption and retreat command receiving unit 309 can receive a data encryption and retreat command via the input device 206A of the image forming apparatus 101 or a data encryption and retreat command from the data encryption and retreat command transmitting unit 323 of the setting value management service 310.

The data encryption and retreat command corresponds to the above-described data retreat instruction. Further, the data-in-device encrypting and retreating unit 308 can receive a data encryption and retreat command from the contract data confirming unit 340. The data encryption and retreat command receiving unit 309 sends a notification including the received command to the data-in-device encrypting and retreating unit 308. The data-in-device encrypting and retreating unit 308 retreats the above-described retreat target data according to the notified command.

The data encryption and retreat command transmitting unit 307 can receive a processing result from the data-in-device encrypting and retreating unit 308, and transmits a data encryption and retreat command to the data encryption and retreat command receiving unit 325 of the setting value management service 310. The data encryption and retreat command, transmitted in this case, instructs retreating the management data that relates to the image forming apparatus 101.

The contract data confirming unit 340 is functionally operable as a contract transmission request unit configured to performs the following processing. The contract data confirming unit 340 requests (transmits a request to) the contract management service 1101 to transmit contract data that corresponds to the image forming apparatus 101.

The contract data confirming unit 340 receives the contract data that corresponds to the request from a contract data notifying unit 1200 of the contract management service 1101. More specifically, the contract data confirming unit 340 is functionally operable as a RSS/ATOM aggregator. The contract data confirming unit 340 uses ATOM1.0 publishing protocols and syndication formats for the data communication. More specifically, the image forming apparatus 101 and the contract management service 1101 perform ATOM communications.

FIGS. 13A and 13B and FIGS. 14A and 14B illustrate request and response examples that can be transmitted and received between the image forming apparatus and the contract management service. FIG. 13A is an example of a request that can be transmitted from an ATOM aggregator function of the contract data confirming unit 340 of the image forming apparatus 101 to an ATOM server function of the contract data notifying unit 1200 of the contract management service 1101.

The request illustrated in FIG. 13A is a GET request required to acquire a service document, which corresponds to an ATOM endpoint. The service document is a list of available collections defined using ATOM protocols.

FIG. 13B illustrates an example of ATOM service document that can be transmitted from the ATOM server function of the contract data notifying unit 1200 of the contract management service 1101 in response to the GET request illustrated in FIG. 13A. A collection element in the service document represents a container that can store accessible contents. In the present exemplary embodiment, there is a collection element that can receive an Atom Entity Document, which is a record of a contract database corresponding to the device identifier.

FIG. 14A illustrates an example of the GET request required to acquire a collection feed. The collection feed is a list of collection entries of records of contract data that corresponds to the device identifier. The GET request illustrated in FIG. 14A can be issued by the ATOM aggregator function of the contract data confirming unit 340 of the image forming apparatus 101 for the URI of the collection acquired in the service document illustrated in FIG. 13B. Through the above-described processing, the contract data confirming unit 340 can acquire the collection feed.

FIG. 14B illustrates an Atom feed document that corresponds to the collection feed acquisition GET request illustrated in FIG. 14A. The illustrated Atom feed document includes a list of contract data recorded as entities corresponding to the device identifier. The contract data confirming unit 340 of the image forming apparatus 101 determines a contract status of the image forming apparatus 101 with reference to the listed records.

The contract data confirming unit 340 is functionally operable as a determination unit configured to determine whether the term of contract for the image forming apparatus 101 has expired with reference to the term of contract included in the record of the above-described contract data. If the contract data confirming unit 340 determines that the term of contract has expired, the contract data confirming unit 340 is functionally operable as an instruction unit configured to perform the following processing. The contract data confirming unit 340 issues a data encryption and retreat command, which instructs performing image forming apparatus related data retreat processing, for the data encryption and retreat command receiving unit 309.

Referring back to FIG. 11, the setting value management service 310 includes a user data holding unit 335, a tenant-oriented configuration data holding unit 314, a virtual device holding unit 311, and an encrypted and retreated data holding unit 326. Further, the setting value management service 310 includes a data encryption and retreat command transmitting unit 323, a management data encrypting and retreating unit 324, and a data encryption and retreat command receiving unit 325. For example, the data encryption and retreat command transmitting unit 323, the management data encrypting and retreating unit 324, and the data encryption and retreat command receiving unit 325 are functionally operable as the data encrypting and retreating unit 394 illustrated in FIG. 3.

The user data holding unit 300 can hold user data that corresponds to a user of the image forming apparatus 101. The encrypted and retreated data holding unit 326 can hold encrypted and retreated data having been subjected to the retreat processing performed by the setting value management service 310. The encrypted and retreated data holding unit 326 can store the encrypted and retreated data in an encrypted and retreated data storage area of the auxiliary storage apparatus 204C, and can manage the encrypted and retreated data.

In the setting value management service 310, the data stored in each of the user data holding unit 335, the tenant-oriented configuration data holding unit 314, and the virtual device holding unit 311 is regarded as retreat target data.

The management data encrypting and retreating unit 324 can encrypt the above-described retreat target data and can send the encrypted retreat target data to the encrypted and retreated data holding unit 326. The encrypted and retreated data holding unit 326 can shore the encrypted retreat target data.

The management data encrypting and retreating unit 324 can obtain a 256-bit SHA256 hash value based on a device identifier character string stored in the nonvolatile memory 202C and an administrator password character string stored in the auxiliary storage apparatus 204C. The management data encrypting and retreating unit 324 designates the obtained hash value as an encryption key. The management data encrypting and retreating unit 324 encrypts the retreat target data using the designated encryption key according to common key AES256 encryption method. The management data encrypting and retreating unit 324 compresses the encrypted data and causes the encrypted and retreated data holding unit 326 to store the compressed data.

The data encryption and retreat command receiving unit 325 can receive a data encryption and retreat command from the data encryption and retreat command transmitting unit 307 of the image forming apparatus 101. Then, the data encryption and retreat command receiving unit 325 can send a notification including the received command to the management data encrypting and retreating unit 324. The management data encrypting and retreating unit 324 can retreat the above-described retreat target data according to the notified command.

The data encryption and retreat command transmitting unit 323 receives a processing result from the management data encrypting and retreating unit 324, and can transmit a data encryption and retreat command that instructs retreating the contract data of the image forming apparatus 101 to the data encryption and retreat command receiving unit 1104 of the contract management service 1101.

The contract management service 1101 includes a contract data holding unit 1105, an encrypted and retreated data holding unit 1106, and a contract data notifying unit 1200. Further, the contract management service 1101 includes a data encryption and retreat command receiving unit 1104, a contract data encrypting and retreating unit 1103, and a data encryption and retreat command notifying unit 1102.

For example, the data encryption and retreat command receiving unit 1104, the contract data encrypting and retreating unit 1103, and the data encryption and retreat command notifying unit 1102 are functionally operable as the data encrypting and retreating unit 396 illustrated in FIG. 3. In the contract management service 1101, the contract data stored in each of the contract data holding unit 1105 is regarded as retreat target data.

The contract data holding unit 1105 is functionally operable as a contract management unit configured to hold contract data. The contract data is data relating to the contract of the image forming apparatus and is functionally regarded as contract information including at least the term of contract.

The encrypted and retreated data holding unit 1106 can hold the encrypted and retreated data having been subjected to the retreat processing performed by the contract management service 1101. The encrypted and retreated data holding unit 1106 can store the encrypted and retreated data in the encrypted and retreated data storage area of the auxiliary storage apparatus 204C, and can manage the encrypted and retreated data.

The contract data encrypting and retreating unit 1103 can obtain a 256-bit SHA256 hash value based on the device identifier character string stored in the nonvolatile memory 202C and the administrator password character string stored in the auxiliary storage apparatus 204C. The contract data encrypting and retreating unit 1103 designates the obtained hash value as an encryption key. The contract data encrypting and retreating unit 1103 encrypts the retreat target data using the designated encryption key according to the common key AES256 encryption method. The contract data encrypting and retreating unit 1103 causes the encrypted and retreated data holding unit 1106 to store the compresses the data.

The data encryption and retreat command receiving unit 1104 can receive a data encryption and retreat command transmitted from the data encryption and retreat command transmitting unit 323 of the setting value management service 310 or a data encryption and retreat command transmitted from the terminal device 102A of the service engineer environment 110. Then, the data encryption and retreat command receiving unit 1104 can send the received command to the contract data encrypting and retreating unit 1103. The contract data encrypting and retreating unit 1103 can retreat the retreat target data, more specifically, the contract data according to the notified command.

Alternatively, the contract data encrypting and retreating unit 1103 can acquire contract data from the contract data holding unit 1105 and can determine whether to retreat the contract data based on the acquired contract data. Then, if it is determined to retreat the contract data, the contract data encrypting and retreating unit 1103 can perform the contract data retreat processing.

For example, the life cycle included in the contract data that corresponds to the image forming apparatus 101 is brought into the state of "restoration in progress", the contract data encrypting and retreating unit 1103 retreats the contract data.

Further, for example, in a case where the term of contract included in the contract data that corresponds to the image forming apparatus 101 has expired, the contract data encrypting and retreating unit 1103 retreats the contract data. In this case, while performing the above-described contract data retreat processing, the contract data encrypting and retreating unit 1103 can request an external service set in the external service 1509 (FIG. 12) included in the contract data to stop the service for the image forming apparatus that corresponds to the retreated contract data.

The contract data notifying unit 1200 receives a request from the contract data confirming unit 340 of the image forming apparatus 101 and acquires the contract data from the contract data holding unit 1105. The contract data notifying unit 1200 sends a response including the acquired contract data to the image forming apparatus 101. The contract data notifying unit 1200 is functionally operable as an RSS/ATOM server and uses ATOM1.0 publishing protocols and syndication formats for the data communication.

Figure 15:
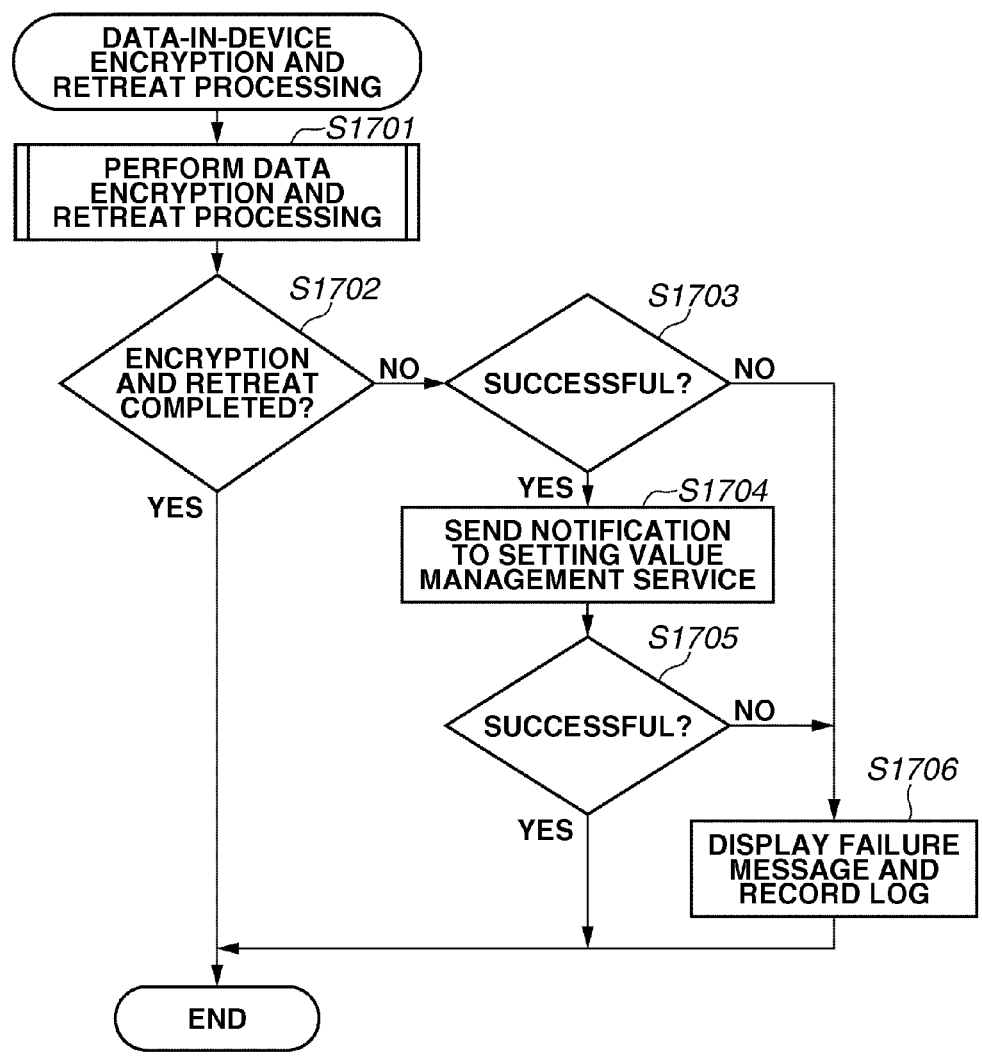
FIG. 15 is an example flowchart illustrating data-in-device encryption retreat processing according to an exemplary embodiment of the present invention.

FIG. 15 is an example flowchart illustrating data-in-device encryption retreat processing that can be performed by the data-in-device encrypting and retreating unit 308 of the image forming apparatus 101.

The data encryption and retreat command receiving unit 309 can receive a data encryption and retreat command via the input device 206A, a data encryption and retreat command from the data encryption and retreat command notifying unit 1102 of the contract management service 1101, or a data encryption and retreat command from the contract data confirming unit 340. The data encryption and retreat command receiving unit 309 sends a notification including the received command to the data-in-device encrypting and retreating unit 308.

Then, the data-in-device encrypting and retreating unit 308 retreats the retreat target data according to the command sent from the data encryption and retreat command receiving unit 309.

First, in step S1701, the data-in-device encrypting and retreating unit 308 performs data encryption and retreat processing (i.e., the processing for retreating the target data retreat). In step S1702, the data-in-device encrypting and retreating unit 308 determines whether the data is already encrypted and retreated. If it is determined that the data is already encrypted and retreated (YES in step S1702), the data-in-device encrypting and retreating unit 308 terminates the processing of the flowchart illustrated in FIG. 15. If it is determined that the data is not yet encrypted and retreated (NO in step S1702), then in step S1703, the data-in-device encrypting and retreating unit 308 determines whether the data retreat processing is successful.

If it is determined that the data retreat processing is successful (YES in step S1703), then in step S1704, the data encryption and retreat command transmitting unit 307 sends a data encryption and retreat command, via the Internet 104, to the data encryption and retreat command receiving unit 325 of the setting value management service 310.

If it is determined that the data retreat processing is failed (NO in step S1703), then in step S1706, a predetermined processing unit included in the image forming apparatus 101 displays a failure message. The failure message indicates the failure in the data retreat processing. Further, in step S1706, the predetermined processing unit included in the image forming apparatus 101 records a log of processing failure.

Next, in step S1705, the data encryption and retreat command transmitting unit 307 determines whether the notification of the data encryption and retreat command is successful. If it is determined that the notification of the data encryption and retreat command is successful (YES in step S1705), the data encryption and retreat command transmitting unit 307 terminates the processing of the flowchart illustrated in FIG. 15. If it is determined that the notification of the data encryption and retreat command is failed (NO in step S1705), the processing proceeds to step S1706.

Figure 16:
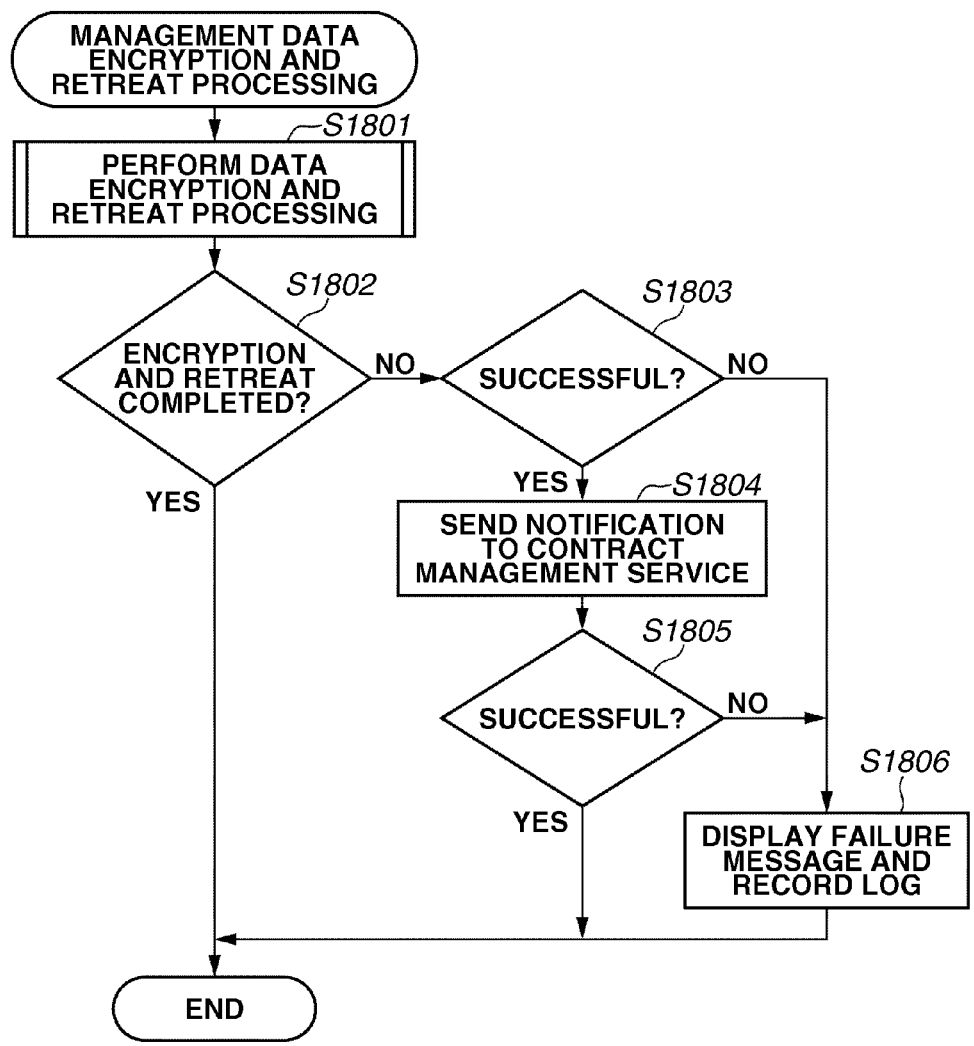
FIG. 16 is an example flowchart illustrating management data encryption and retreat processing according to an exemplary embodiment of the present invention.

FIG. 16 is an example flowchart illustrating management data encryption and retreat processing that can be performed by the management data encrypting and retreating unit 324 of the setting value management service 310. The data encryption and retreat command receiving unit 325 receives a data encryption and retreat command from the terminal device 102A of the service engineer environment 110 or from the data encryption and retreat command transmitting unit 307 of the image forming apparatus 101.

The data encryption and retreat command receiving unit 325 sends a notification including the received command to the management data encrypting and retreating unit 324. Then, the management data encrypting and retreating unit 324 retreats the retreat target data according to the notified command.

Processing to be performed in steps S1801 through S1803 is similar to the processing performed in steps S1701 through S1703 illustrated in FIG. 15. Further, processing to be performed in step S1805 and S1806 is similar to the processing performed in steps S1705 and S1706 illustrated in FIG. 15. In step S1804, the data encryption and retreat command transmitting unit 323 sends a data encryption and retreat command that instructs retreating the contract data of the image forming apparatus 101 to the data encryption and retreat command receiving unit 1104 of the contract management service 1101.

Figure 17:
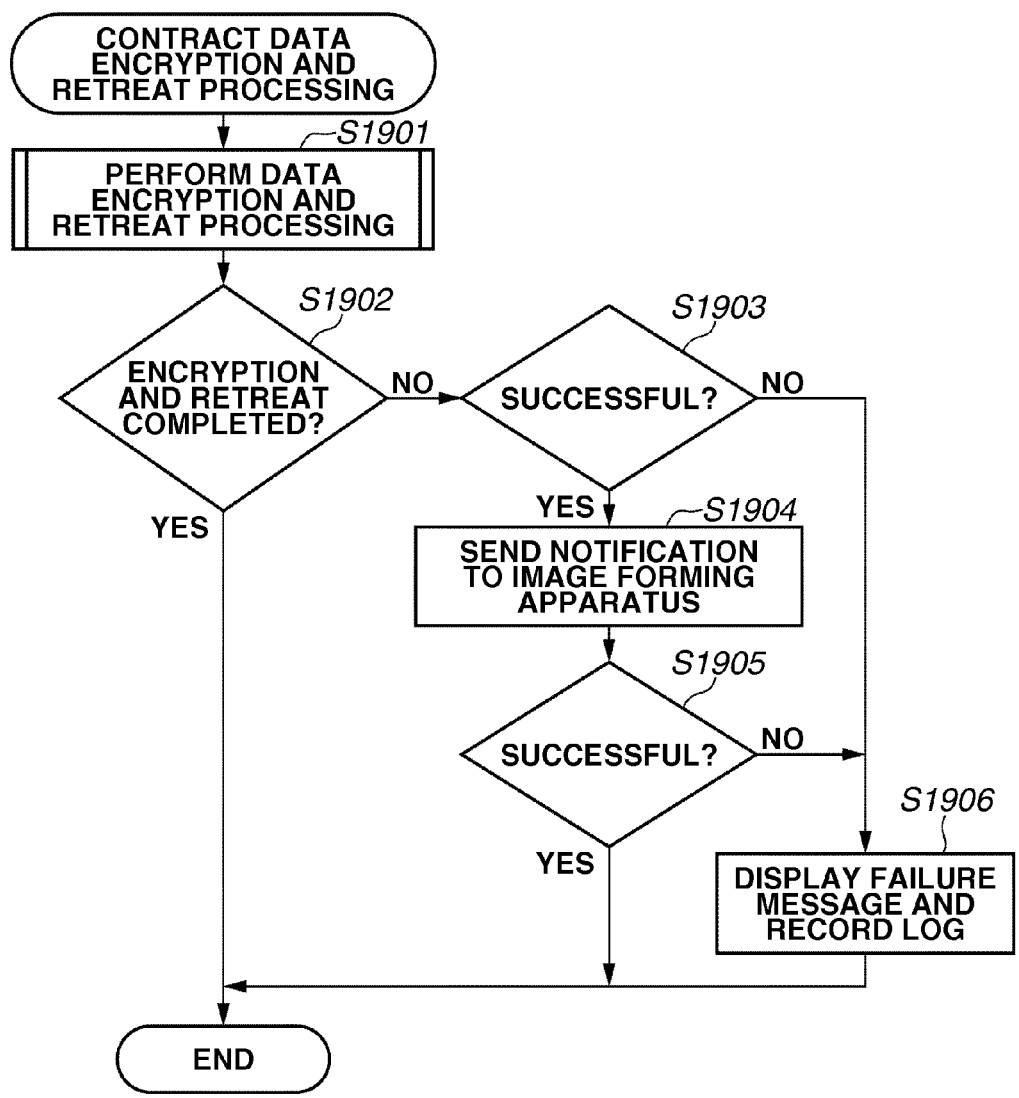
FIG. 17 is an example flowchart illustrating contract data encryption and retreat processing according to an exemplary embodiment of the present invention.

FIG. 17 is an example flowchart illustrating contract data encryption and retreat processing that can be performed by the contract data encrypting and retreating unit 1103 of the contract management service 1101. The data encryption and retreat command receiving unit 1104 receives a data encryption and retreat command from the terminal device 102A of the service engineer environment 110 or the data encryption and retreat command transmitting unit 323 of the setting value management service 310.

The data encryption and retreat command receiving unit 1104 sends a notification including the received command to the contract data encrypting and retreating unit 1103. Then, the contract data encrypting and retreating unit 1103 retreats the retreat target data according to the notified command.

Processing to be performed in steps S1901 through S1903 is similar to the processing performed in steps S1701 through S1703 illustrated in FIG. 15. Further, processing to be performed in steps S1905 and S1906 is similar to the processing performed in steps S1705 and S1706 illustrated in illustrated in FIG. 15. In step S1904, the data encryption and retreat command notifying unit 1102 sends the data encryption and retreat command to the data encryption and retreat command receiving unit 309 of the image forming apparatus 101.

Figure 18:
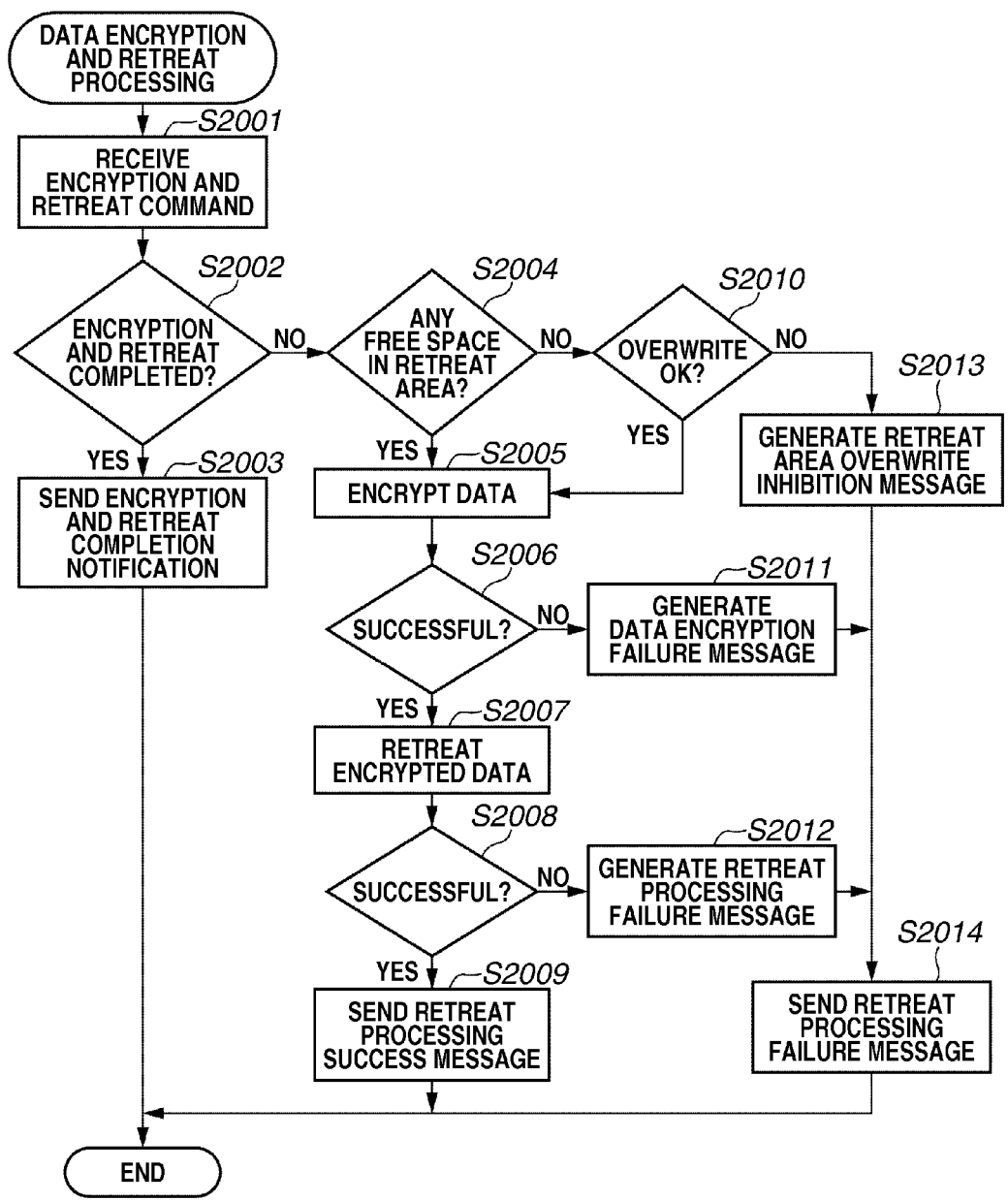
FIG. 18 is an example flowchart illustrating data encryption and retreat processing according to an exemplary embodiment of the present invention.

FIG. 18 is an example flowchart illustrating the data encryption and retreat processing that can be performed by the image forming apparatus 101 (see S1701 in FIG. 15). The data encryption and retreat processing to be performed by the setting value management service 310 (see step S1801 illustrated in FIG. 16) and the data encryption and retreat processing to be performed by the contract management service 1101 (see step S1901 illustrated in FIG. 17) are similar to the data encryption and retreat processing described with reference to FIG. 18.

First, in step S2001, the data-in-device encrypting and retreating unit 308 of the image forming apparatus 101 receives a data encryption and retreat command from the data encryption and retreat command receiving unit 309 and starts target data retreat processing. Subsequently, in step S2002, the data-in-device encryption retreat processing 308 determines whether the data is already encrypted and retreated with reference to the encrypted and retreated data holding unit 328.

If it is determined that the data is already encrypted and retreated (YES in step S2002), the processing proceeds to step S2003. Then, in step S2003, the data-in-device encrypting and retreating unit 308 sends information indicating that the data is already encrypted and retreated to a transmission source of the data encryption and retreat command. Then, the data-in-device encrypting and retreating unit 308 terminates the processing of the flowchart illustrated in FIG. 18.

If it is determined that the data is not yet encrypted and retreated (NO in step S2002), the processing proceeds to step S2004. Then, in step S2004, the data-in-device encrypting and retreating unit 308 determines whether there is any free space in the retreat area. If it is determined that a free space is present in the retreat area (YES in step S2004), the processing proceeds to step S2005. If it is determined that there in not any free space in the retreat area (NO in step S2004), then in step S2010, the data-in-device encrypting and retreating unit 308 determines whether overwriting the existing data is permitted. If overwriting the existing data is permitted (YES in step S2010), the processing proceeds to step S2005.

If overwriting the existing data is inhibited (NO in step S2010), the processing proceeds to step S2013. Then, in step S2013, the data-in-device encrypting and retreating unit 308 generates a retreat area overwrite inhibition message. The retreat area overwrite inhibition message is a message indicating that there is not any free space in the retreat area and overwriting the existing data is inhibited.

Subsequently, in step S2014, the data-in-device encrypting and retreating unit 308 sends a retreat processing failure message that indicates failure in the data retreat processing to the transmission source of the data encryption and retreat command. Then, the data-in-device encrypting and retreating unit 308 terminates the processing of the flowchart illustrated in FIG. 18. The retreat processing failure message includes the retreat area overwrite inhibition message generated in step S2013.

In step S2005, the data-in-device encrypting and retreating unit 308 encrypts the retreat target data. Then, in step S2006, the data-in-device encrypting and retreating unit 308 determines whether the retreat target data encryption processing is successful. If it is determined that the retreat target data encryption processing is successful (YES in step S2006), the processing proceeds to step S2007. If it is determined that the retreat target data encryption processing is failed (NO in step S2006), the processing proceeds to step S2011.

In step S2011, the data-in-device encrypting and retreating unit 308 generates a data encryption failure message. The data encryption failure message is a message indicating that the retreat target data encryption processing is failed. Then, in step S2014, the data-in-device encrypting and retreating unit 308 sends a retreat processing failure message including the data encryption failure message to the transmission source of the data encryption and retreat command.

In step S2007, the data-in-device encrypting and retreating unit 308 retreats the data encrypted in step S2006 to the retreat area. Subsequently, in step S2008, the data-in-device encrypting and retreating unit 308 determines whether the encrypted data retreat processing is successful. If it is determined that the encrypted data retreat processing is failed (NO in step S2008), the processing proceeds to step S2012.

In step S2012, the data-in-device encrypting and retreating unit 308 generates a retreat processing failure message. Then, in step S2014, the data-in-device encrypting and retreating unit 308 sends the retreat processing failure message to the transmission source of the data encryption and retreat command.

If it is determined that the encrypted data retreat processing is successful (YES in step S2008), the processing proceeds to step S2009. Then, in step S2009, the data-in-device encrypting and retreating unit 308 sends a retreat processing success message to the transmission source of the data encryption and retreat command. Then, the data-in-device encrypting and retreating unit 308 terminates the processing of the flowchart illustrated in FIG. 18. The retreat processing success message is a message indicating that the data retreat processing is successful.

Figure 19:
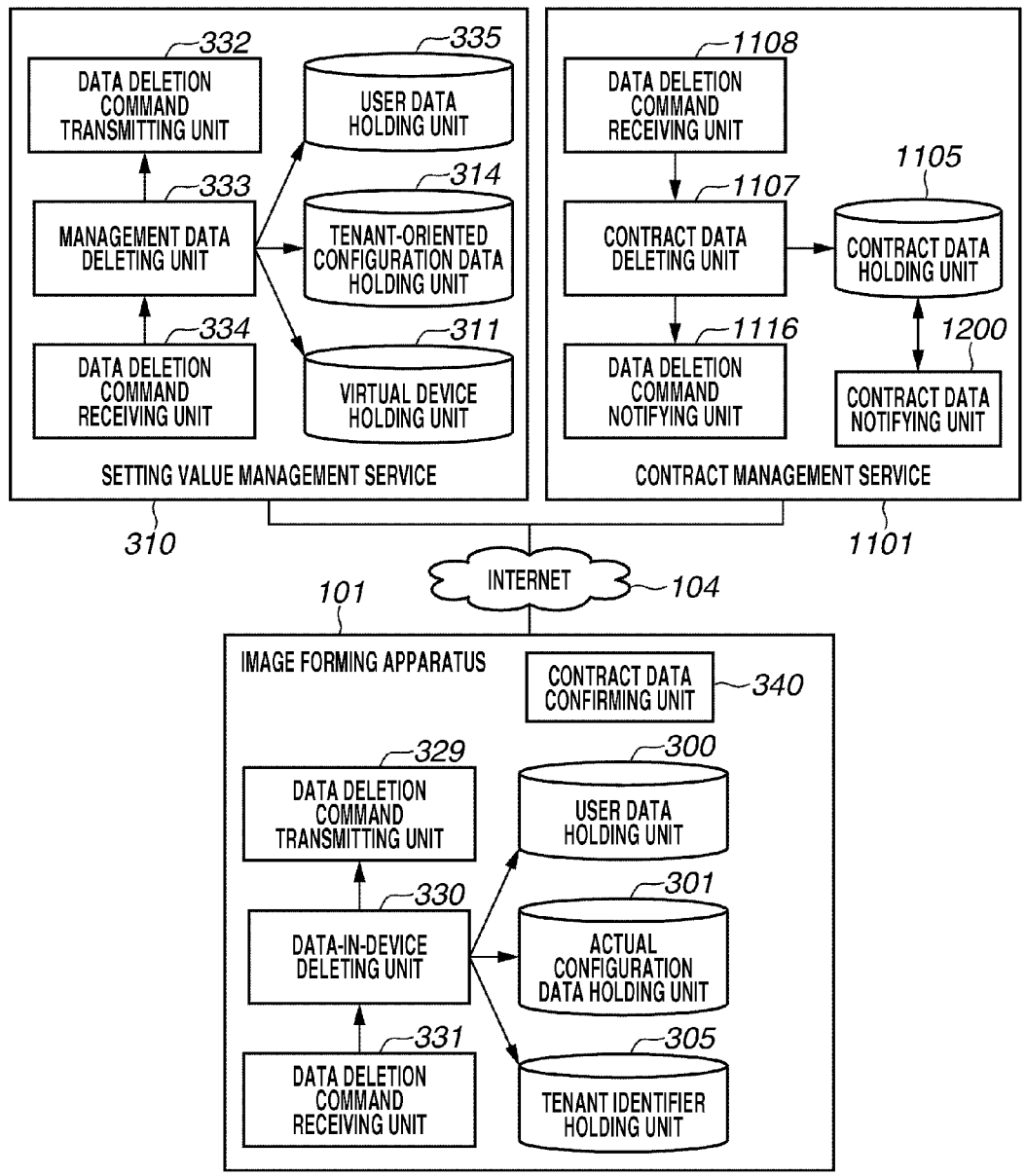
FIG. 19 is an example functional block diagram illustrating an information processing system relating to data deletion processing.

FIG. 19 is an example functional block diagram illustrating an information processing system relating to the data deletion processing.

The target data to be subjected to the deletion processing of the information processing system is hereinbelow referred to as deletion target data. The deletion target data that corresponds to the image forming apparatus 101, for example, includes user data to be held for each log-in user (e.g., address book), actual configuration data, and tenant identifier. The deletion target data that corresponds to the setting value management service 310, for example, includes user data to be held for each log-in user (e.g., address book), virtual configuration data, tenant-oriented configuration data, and tenant identifier. The deletion target data that corresponds to the contract management service 1101 includes contract data.

The user data holding unit 300, the actual configuration data holding unit 301, and the tenant identifier holding unit 305 of the image forming apparatus 101 illustrated inn FIG. 19 are respectively similar to the user data holding unit 300, the actual configuration data holding unit 301, and the tenant identifier holding unit 305 illustrated in FIG. 11. Further, the image forming apparatus 101 includes a data deletion command receiving unit 331, a data-in-device deleting unit 330, a data deletion command transmitting unit 329, and a contract data confirming unit 340.

The data deletion command receiving unit 331, the data-in-device deleting unit 330, and the data deletion command transmitting unit 329 are functionally operable as the data deleting unit 391 illustrated in FIG. 3. In the image forming apparatus 101, the data stored in each of the user data holding unit 300, the actual configuration data holding unit 301, and the tenant identifier holding unit 305 is regarded as deletion target data.

The data-in-device deleting unit 330 can delete the deletion target data. The data deletion command receiving unit 331 can receive a data deletion command via the input device 206A of the image forming apparatus 101 or a data deletion command from the data deletion command notifying unit 1116 of the setting value management service 310.

Further, the data deletion command receiving unit 331 receives a data deletion command from the contract data confirming unit 340. The data deletion command corresponds to the above-described data deletion instruction. The data deletion command receiving unit 331 sends a notification including the received command to the data-in-device deleting unit 330. The data-in-device deleting unit 330 deletes the deletion target data according to the notified command.

The data deletion command transmitting unit 329 receives a processing result from the data-in-device deleting unit 330, and transmits a data deletion command that instructs deleting the management data relating to the image forming apparatus 101 to the data deletion command receiving unit 334 of the setting value management service 310.

The contract data confirming unit 340 transmits a request, which requests transmission of the contract data that corresponds to the image forming apparatus 101, to the contract management service 1101. The contract data confirming unit 340 receives the contract data from the contract data notifying unit 1200 of the contract management service 1101 according to the request.

The contract data confirming unit 340 refers to the received contract data and determines the contract status of the image forming apparatus 101. More specifically, the contract data confirming unit 340 determines whether the term of contract for the image forming apparatus 101 has expired with reference to the term of contract information included in the record of the contract data.

If it is determined that the contract data confirming unit 340 determines that the term of contract has expired, the contract data confirming unit 340 issues a data deletion command for the data deletion command receiving unit 331 (namely, instructs deleting the data relating to the image forming apparatus).

Whether the contract data confirming unit 340 issues the data deletion command or issues the data encryption and retreat command as described with reference to FIG. 11 is determined beforehand or designated by a user operation.

The user data holding unit 335, the tenant-oriented configuration data holding unit 314, and the virtual device holding unit 311 illustrated in FIG. 19 are respectively similar to the user data holding unit 335, the tenant-oriented configuration data holding unit 314, and the virtual device holding unit 311 illustrated in FIG. 11.

The setting value management service 310 includes a data deletion command transmitting unit 332, a management data deleting unit 333, and the data deletion command receiving unit 334. The data deletion command transmitting unit 332, the management data deleting unit 333, and the data deletion command receiving unit 334 are functionally operable as the data deleting unit 393 illustrated in FIG. 3.

In the setting value management service 310, the data stored in each of the user data holding unit 335, the tenant-oriented configuration data holding unit 314, and the virtual device holding unit 311 is regarded as deletion target data.

The management data deleting unit 333 can delete the retreat target data. The data deletion command receiving unit 334 can receive a data deletion command from the data deletion command transmitting unit 329 of the image forming apparatus 101. Then, the data deletion command receiving unit 334 sends a notification including the received command to the management data deleting unit 333. The management data deleting unit 333 deletes the deletion target data according to the notified command.

The data deletion command transmitting unit 332 receives a processing result from the management data deleting unit 333 and transmits a data deletion command instructing deleting the contract data of the image forming apparatus 101 to the data deletion command receiving unit 1108 of the contract management service 1101.

The contract data holding unit 1105 and the contract data notifying unit 1200 illustrated in FIG. 10 are similar to the contract data holding unit 1105 and the contract data notifying unit 1200 illustrated in FIG. 11. Further, the contract management service 1101 includes a data deletion command notifying unit 1116, a contract data deleting unit 1107, and a deletion command receiving unit 1108.

The data deletion command notifying unit 1116, the contract data deleting unit 1107, and the data deletion command receiving unit 1108 are functionally operable as the data deleting unit 395 illustrated in FIG. 3. In the contract management service 1101, the contract data stored in the contract data holding unit 1105 is designated as deletion target data.

The contract data deleting unit 1107 can delete the contract data stored in the contract data holding unit 1105. The data deletion command receiving unit 1108 receives a data deletion command from the data deletion command transmitting unit 332 of the setting value management service 310 or a data deletion command from the terminal device 102A of the service engineer environment 110. Then, the data deletion command receiving unit 1108 sends a notification including the received command to the contract data deleting unit 1107. The contract data deleting unit 1107 deletes the deletion target data (more specifically, performs contract data deletion processing) according to the notified command.

Alternatively, the contract data deleting unit 1107 may acquire the contract data from the contract data holding unit 1105 and determine whether to perform contract data deletion processing based on the contract data, and if it is determined to perform the contract data deletion processing, can delete the contract data.

For example, if the life cycle included in the contract data that corresponds to the image forming apparatus 101 is brought into the state of "restoration in progress", the contract data deleting unit 1107 deletes the contract data.

Further, for example, the term of contract included in the contract data that corresponds to the image forming apparatus 101 has already expired, the contract data deleting unit 1107 deletes the contract data. Whether the contract data deleting unit 1107 deletes the contract data based on the life cycle or retreats the contract data as described with reference to FIG. 11 is determined beforehand or designated by a user. In this case, while performing the above-described contract data deletion processing, the contract data deleting unit 1107 can request an external service set in the external service 1509 (FIG. 12) included in the contract data to stop the service for the image forming apparatus that corresponds to the deleted contract data.

The contract data notifying unit 1200 receives a request from the contract data confirming unit 340 of the image forming apparatus 101 and acquires contract data from the contract data holding unit 1105. The contract data notifying unit 1200 sends a response including the acquired contract data to the image forming apparatus 101.

Figure 20:
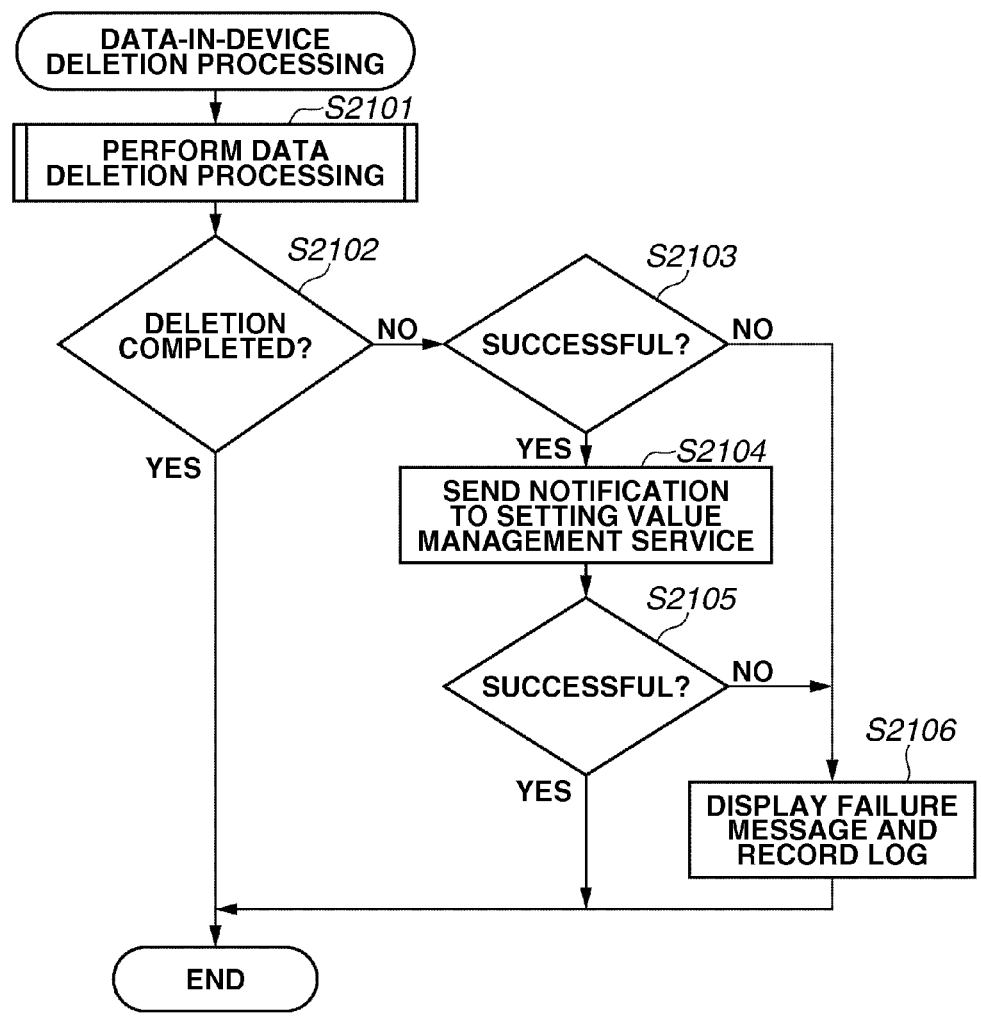
FIG. 20 is an example flowchart illustrating data-in-device deletion processing according to an exemplary embodiment of the present invention.

FIG. 20 is an example flowchart illustrating data-in-device deletion processing that can be performed by the data-in-device deleting unit 330 of the image forming apparatus 101.

The data deletion command receiving unit 331 receives a data deletion command via the input device 206A of the image forming apparatus 101, a data deletion command from the data deletion command notifying unit 1116 of the contract management service 1101, or a data deletion command from the contract data confirming unit 340.

The data deletion command receiving unit 331 sends a notification including the received command to the data-in-device deleting unit 330. Then, the data-in-device deleting unit 330 performs the deletion target data deletion processing according to the command received from a data deletion command receiving unit 339.

First, in step S2101, the data-in-device deleting unit 330 performs data deletion processing. Then, in step S2102, the data-in-device deleting unit 330 determines whether the data deletion processing has been completed. If it is determined that the data deletion processing is already completed (YES in step S2102), the data-in-device deleting unit 330 terminates the processing of the flowchart illustrated in FIG. 20. If it is determined that the data deletion is not yet completed (NO in step S2102), then in step S2103, the data-in-device deleting unit 330 determines whether the data deletion processing is successful.

If it is determined that the data deletion processing is successful (YES in step S2103), then in step S2104, the data deletion command transmitting unit 329 sends a data deletion command, via the Internet 104, to the data deletion command receiving unit 334 of the setting value management service 310. If it is determined that the data deletion processing is failed (NO in step S2103), then in step S2106, a predetermined processing unit included in the image forming apparatus 101 displays a failure message.

The failure message indicates the failure in the data deletion processing. Further, in step S2106, the predetermined processing unit included in the image forming apparatus 101 records a log of processing failure.

Next, in step S2105, the data deletion command transmitting unit 329 determines whether the notification of the data deletion command is successful. If it is determined that the notification of the data deletion command is successful (YES in step S2105), the data deletion command transmitting unit 329 terminates the processing of the flowchart illustrated in FIG. 20. If it is determined that the notification of the data deletion command is failed (NO in step S2105), the processing proceeds to step S2106.

Figure 21:
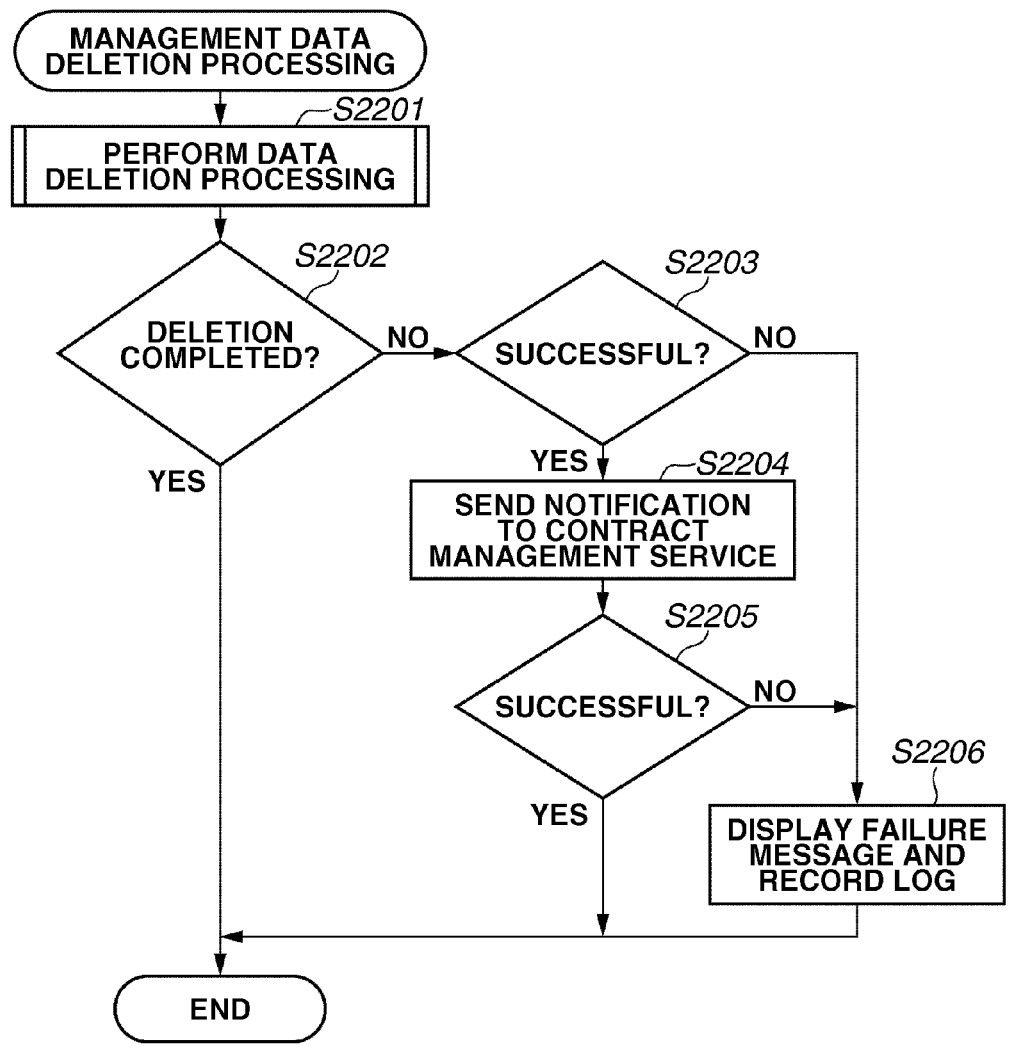
FIG. 21 is an example flowchart illustrating setting value data deletion processing according to an exemplary embodiment of the present invention.

FIG. 21 is an example flowchart illustrating management data deletion processing that can be performed by the management data deleting unit 333 of the setting value management service 310. The data deletion command receiving unit 334 receives a data deletion command from the terminal device 102A of the service engineer environment 110 or from the data deletion command transmitting unit 329 of the image forming apparatus 101.

The data deletion command receiving unit 334 sends a notification including the received command to the management data deleting unit 333. Then, the management data deleting unit 333 deletes the deletion target data according to the notified command.

Processing to be performed in steps S2201 through S2203 is similar to the processing performed in steps S2101 through S2103 illustrated in FIG. 20. Further, processing to be performed in step S2205 and S2206 is similar to the processing performed in steps S2105 and S2106 illustrated in FIG. 20. In step S2204, the data deletion command transmitting unit 332 sends a data deletion command instructing deletion of the contract data of the image forming apparatus 101 to the data deletion command receiving unit 1108 of the contract management service 1101.

Figure 22:
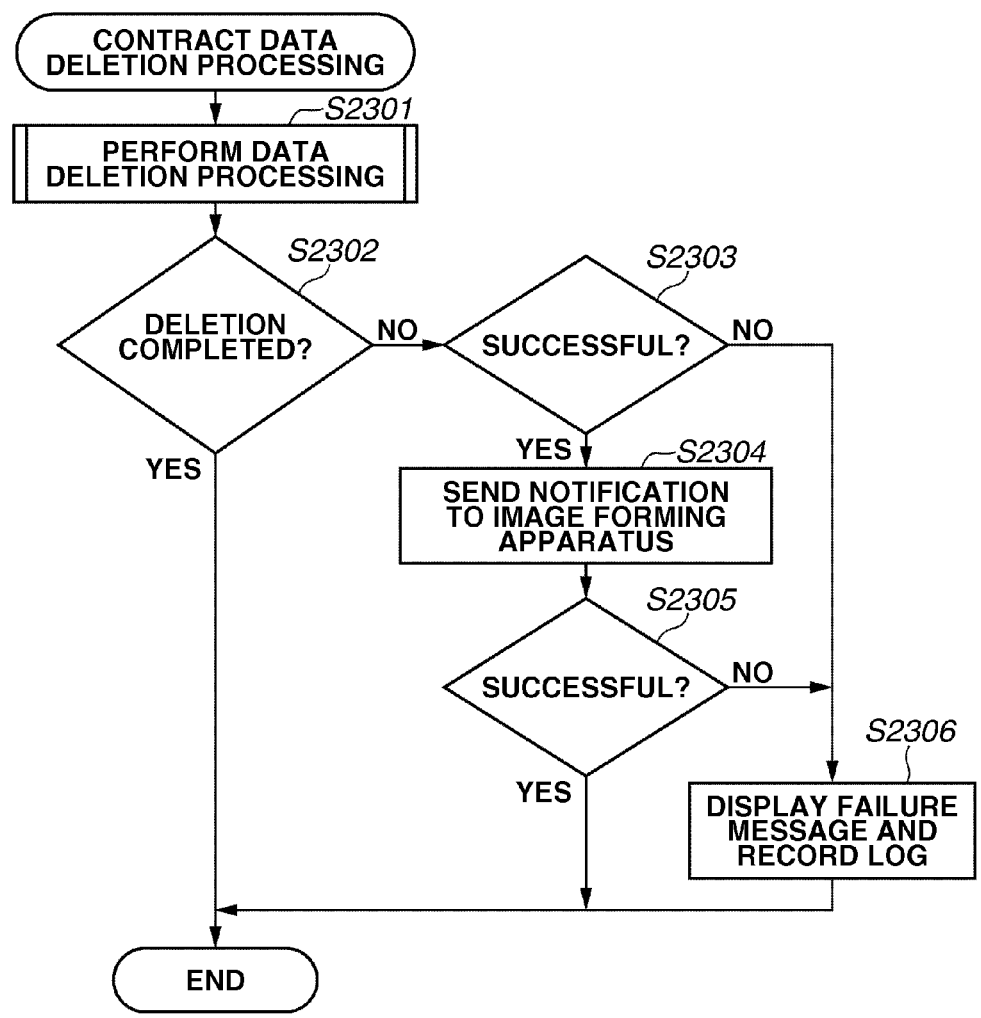
FIG. 22 is an example flowchart illustrating contract data deletion processing according to an exemplary embodiment of the present invention.

FIG. 22 is an example flowchart illustrating contract data deletion processing that can be performed by the contract data deleting unit 1107 of the contract management service 1101. The data deletion command receiving unit 1108 receives a data deletion command from the terminal device 102A of the service engineer environment 110 or from the data deletion command transmitting unit 332 of the setting value management service 310.

The data deletion command receiving unit 1108 sends a notification including the received command to the contract data deleting unit 1107. Then, the contract data deleting unit 1107 deletes the deletion target data according to the notified command.

Processing to be performed in steps S2301 through S2303 is similar to the processing performed in steps S2101 through S2103 illustrated in FIG. 20. Further, processing to be performed in steps S2305 and S2306 is similar to the processing performed in steps S2105 and S2106 illustrated in FIG. 20. In step S2304, the data deletion command notifying unit 1116 sends a data deletion command to the data deletion command receiving unit 331 of the image forming apparatus 101.

Figure 23:
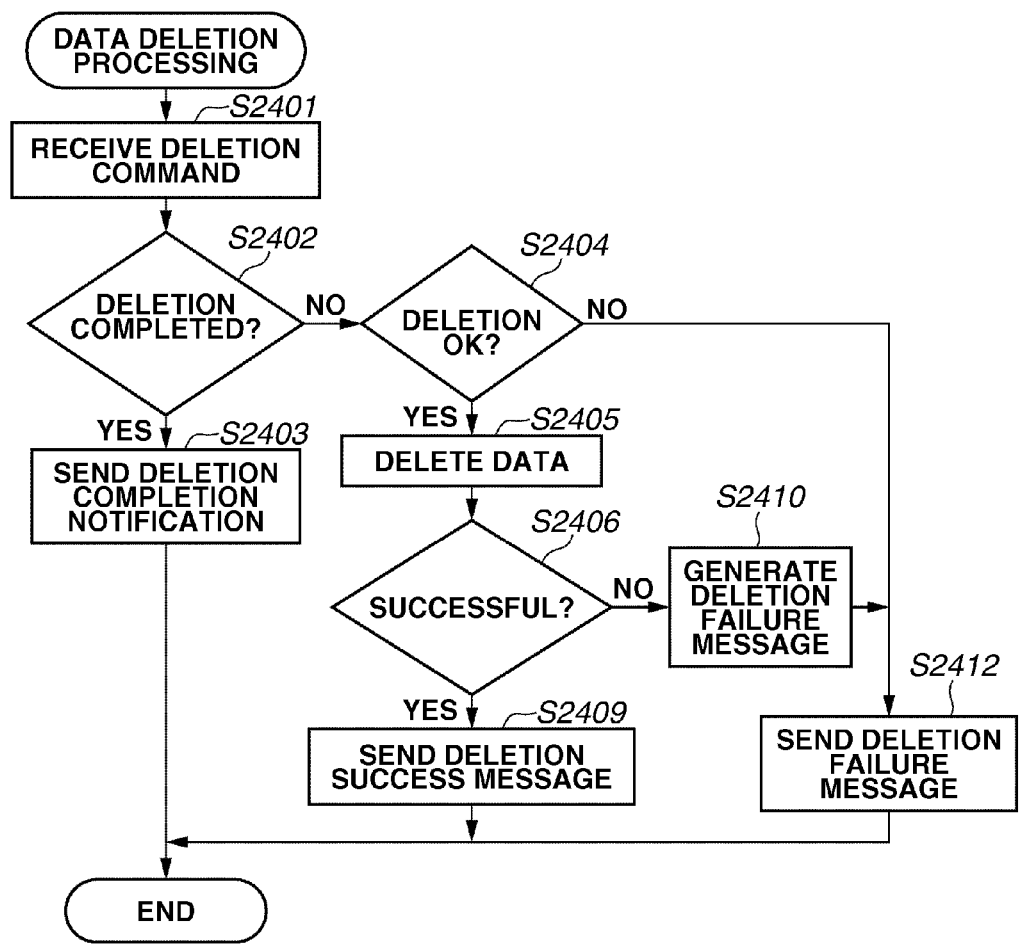
FIG. 23 is an example flowchart illustrating data deletion processing according to an exemplary embodiment of the present invention.

FIG. 23 is an example flowchart illustrating the data deletion processing (see step S2101 in FIG. 20) that can be performed by the image forming apparatus 101. The data deletion processing to be performed by the setting value management service 310 (see step S2201 illustrated in FIG. 21) and the data deletion processing to be performed by the contract management service 1101 (see step S2301 illustrated in FIG. 22) are similar to the data deletion processing described with reference to FIG. 23.

First, in step S2401, the data-in-device deleting unit 330 of the image forming apparatus 101 receives a data deletion command from the data deletion command receiving unit 331 and starts deleting the deletion target data. Subsequently, in step S2402, the data-in-device deleting unit 330 determines whether the data deletion processing has been completed.

If it is determined that the data deletion processing has been completed (YES in step S2402), the processing proceeds to step S2403. Then, in step S2403, the data-in-device deleting unit 330 sends information indicating the completion of the data deletion processing to a transmission source of the data deletion command. Then, the data-in-device deleting unit 330 terminates the processing of the flowchart illustrated in FIG. 23.

If it is determined that the data deletion processing is not yet completed (NO in step S2402), the processing proceeds to step S2404. Then, in step S2404, the data-in-device deleting unit 330 determines whether deletion of the data is possible. If it is determined that the deletion of the data is possible (YES in step S2404), the processing proceeds to step S2405.

If it is determined that the deletion of the data is possible (NO in step S2404), the processing proceeds to step S2412. In step S2412, the data-in-device deleting unit 330 sends a deletion failure message to the transmission source of the data deletion command. Then, the data-in-device deleting unit 330 terminates the processing of the flowchart illustrated in FIG. 23. The deletion failure message is a message indicating the failure in the data deletion processing.

In step S2405, the data-in-device deleting unit 330 deletes the deletion target data. Then, in step S2406, the data-in-device deleting unit 330 determines whether the deletion of the deletion target data is successful.

If it is determined that the deletion of the deletion target data is successful (YES in step S2406), then in step S2409, the data-in-device deleting unit 330 sends a data deletion success message to a transmission source of the data deletion command and terminates the processing of the flowchart illustrated in FIG. 23. The data deletion success message is a message indicating that the data deletion processing is successful.

If it is determined that the deletion of the deletion target data is failed (NO in step S2406), the processing proceeds to step S2410. In step S2410, the data-in-device deleting unit 330 generates a deletion failure message. Then, the processing proceeds to step S2412.

In the information processing system according to the present exemplary embodiment, when the image forming apparatus has performed the data deletion processing or the retreat processing, an apparatus that manages the image forming apparatus is instructed to perform deletion processing or retreat processing on management related data. Therefore, for example, when the image forming apparatus is scrapped, the information processing system according to the present exemplary embodiment can surely delete or retreat the data relating to the image forming apparatus from the image forming apparatus, and can surely delete or retreat the management data of the image forming apparatus from the apparatus that manages the image forming apparatus.

FIG. 24 is an example flowchart illustrating operation processing that can be performed by an information processing system according to another exemplary embodiment, which has a basic configuration similar to that described with reference to FIG. 3, FIG. 11, and FIG. 19.

The operation processing illustrated in FIG. 24 is hereinbelow referred to as "encrypted and retreated data deletion processing." The image forming apparatus 101 performs the encrypted and retreated data deletion processing in the following manner. When the data deleting unit 391 (see FIG. 3) deletes the data relating to the image forming apparatus, the data deleting unit 391 instructs the data encrypting and retreating unit 392 to temporarily retreat the image forming apparatus related data. Then, if a predetermined time has elapsed since the execution of the retreat processing, the data deleting unit 391 deletes the retreated encrypted and retreated data.

The setting value management service 310 performs the encrypted and retreated data deletion processing in the following manner. When the data deleting unit 393 (see FIG. 3) deletes the management data of the image forming apparatus, the data deleting unit 393 instructs the data encrypting and retreating unit 394 to temporarily retreat the image forming apparatus related management data. Then, if a predetermined time has elapsed since the execution of the retreat processing, the data deleting unit 393 deletes the retreated management data.

The contract management service 1101 performs the encrypted and retreated data deletion processing in the following manner. When the data deleting unit 395 (see FIG. 3) deletes the contract data of the image forming apparatus, the data deleting unit 395 instructs the data encrypting and retreating unit 396 to temporarily retreat the contract data of the image forming apparatus. Then, if a predetermined time has elapsed since the execution of the retreat processing, the data deleting unit 395 deletes the retreated contract data.

The encrypted and retreated data deletion processing to be performed by the image forming apparatus 101 is described below. The encrypted and retreated data deletion processing to be performed by the setting value management service 310 or the contract management service 1101 is similar to the encrypted and retreated data deletion processing performed by the image forming apparatus 101.

If the data-in-device deleting unit 330 illustrated in FIG. 19 receives a data deletion command, the data-in-device deleting unit 330 instructs the data-in-device encrypting and retreating unit 308 illustrated in FIG. 11 to temporarily retreat the data relating to the image forming apparatus 101. Subsequently, in step S2501, the data-in-device deleting unit 330 (FIG. 19) of the image forming apparatus 101 confirms the encrypted and retreated data storage area of the auxiliary storage apparatus 204A of the image forming apparatus 101, which is managed by the encrypted and retreated data holding unit 328 (see FIG. 11).

Subsequently, in step S2502, the data-in-device deleting unit 330 determines whether there is any encrypted and retreated data in the encrypted and retreated data storage area. If it is determined that there is not any encrypted and retreated data in the encrypted and retreated data storage area (NO in step S2502), the data-in-device deleting unit 330 terminates the processing of the flowchart illustrated in FIG. 24. If it is determined that at least one piece of encrypted and retreated data is present in the encrypted and retreated data storage area (YES in step S2502), the processing proceeds to step S2503.

Next, in step S2503, the data-in-device deleting unit 330 confirms retreated data and time information (i.e., information indicating the date and time when the encrypted and retreated data has been retreated in the encrypted and retreated data storage area). Subsequently, in step S2504, the data-in-device deleting unit 330 determines whether a predetermined time has elapsed since the data retreat processing with reference to the retreat date and time information confirmed in step S2503 and the present data and time information.

If the data-in-device deleting unit 330 determines that the predetermined time has not yet elapsed since the data retreat processing (NO in step 2504), the data-in-device deleting unit 330 terminates the processing of the flowchart illustrated in FIG. 24. If the data-in-device deleting unit 330 determines that the predetermined time has elapsed since the data retreat processing (YES in step 2504), then in step S2505, the data-in-device deleting unit 330 deletes the encrypted and retreated data from the encrypted and retreated data storage area.

The information processing system according to another exemplary embodiment described with reference to the flowchart illustrated in FIG. 24 temporarily retreats deletion target data and holds the processed data as encrypted and retreated data. Then, the information processing system deletes the encrypted and retreated data after a predetermined time has elapsed. Accordingly, the information processing system can prevent the data from being erroneously erased according to an incorrect deletion instruction.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-156727 filed Jul. 15, 2011, which is hereby incorporated by reference herein in its entirety.

What is claimed is:

1. An information processing system that includes a management apparatus that can manage at least operational setting information to be used to switch an operational state of an image forming apparatus and an image forming apparatus that can be managed by the management apparatus in each predetermined unit of management,
   wherein the image forming apparatus comprises at least one processor coupled via a bus to a memory, the processor being programmed to control one or more of:
   a request unit configured to transmit an operational setting information generation request that corresponds to the image forming apparatus, which includes changed configuration information, to the management apparatus, if there is any change in configuration information of a device included in the image forming apparatus;
   an acquiring unit configured to acquire operational setting information that corresponds to the image forming apparatus from the management apparatus that has generated the operational setting information in response to the operational setting information generation request;
   a first retreat processing unit configured to perform first retreat processing for encrypting and retreating information relating to the image forming apparatus, including at least the operational setting information; and
   a first deletion processing unit configured to perform first deletion processing for deleting information relating to the image forming apparatus,
   wherein the first retreat processing unit is configured to instruct a second retreat processing unit included in the management apparatus, via a network, to retreat management information of the image forming apparatus when the first retreat processing is executed for the information relating to the image forming apparatus, and
   wherein the first deletion processing unit is configured to instruct a second deletion processing unit included in the management apparatus, via the network, to delete the management information of the image forming apparatus when the first deletion processing is executed for the operational setting information,
   wherein the management apparatus comprises:
   a request receiving unit configured to receive the operational setting information generation request that corresponds to the image forming apparatus from the image forming apparatus;
   a generating unit configured to generate operational setting information that corresponds to the image forming apparatus based on configuration information of a device included in the image forming apparatus, which is included in the operational setting information generation request; and
   a transmitting unit configured to transmit the generated operational setting information to the image forming apparatus,
   wherein the second retreat processing unit is configured to perform second retreat processing for encrypting and retreating management information of the image forming apparatus, including at least information relating to management of the operational setting information,
   wherein the second deletion processing unit is configured to perform second deletion processing for deleting the management information of the image forming apparatus,
   wherein the second retreat processing unit is configured to instruct a contract management service, via the network, to retreat information corresponding to the management information when the second retreat processing is executed for the management information of the image forming apparatus, and
   wherein the second deletion processing unit is configured to instruct the contract management service, via the network, to delete the information corresponding to the management information when the second deletion processing is executed for the management information of the image forming apparatus.

2. The information processing system according to claim 1, wherein the first retreat processing unit included in the image forming apparatus is configured to temporarily retreat the information relating to the image forming apparatus when the deletion processing is executed for the information relating to the image forming apparatus and wherein the first deletion processing unit is configured to delete the information subjected to the retreat processing after a predetermined time has elapsed since the execution of the retreat processing, wherein the second retreat processing unit included in the management apparatus is configured to temporarily retreat the management information of the image forming apparatus when the deletion processing is executed for the management information of the image forming apparatus and wherein the second deletion processing unit is configured to delete the information subjected to the retreat processing after a predetermined time has elapsed since the execution of the retreat processing.

3. The information processing system according to claim 1, wherein the management apparatus further comprises:
   a contract management unit configured to manage contract information relating to a contract of the image forming apparatus, including at least a term of contract;
   a third retreat processing unit configured to perform retreat processing for encrypting and retreating the contract information of the image forming apparatus managed by the contract management unit;
   a third deletion processing unit configured to perform deletion processing for deleting the contract information of the image forming apparatus; and
   a contract transmitting unit configured to transmit the contract information of the image forming apparatus to the image forming apparatus in response to a request from the image forming apparatus,
wherein the second retreat processing unit is configured to instruct the third retreat processing unit to retreat the contract information of the image forming apparatus when the retreat processing is executed for the management information of the image forming apparatus, and configured to instruct the third deletion processing unit to delete the contract information of the image forming apparatus when the deletion processing is executed for the management information of the image forming apparatus,
wherein the image forming apparatus further comprises:
   a contract transmission request unit configured to request the management apparatus to transmit the contract information of the image forming apparatus;
   a determination unit configured to acquire contract information from the management apparatus in response to the request and determine whether the term of contract for the image forming apparatus has expired with reference to term of contract information included in the contract information; and
   an instruction unit configured to instruct the first retreat/deletion processing unit to retreat the information relating to the image forming apparatus or delete the information relating to the image forming apparatus if it is determined that the term of contract for the image forming apparatus has expired.

4. The information processing system according to claim 3, wherein the third retreat processing unit included in the management apparatus is configured to temporarily retreat the contract information of the image forming apparatus when the deletion processing is executed for the contract information of the image forming apparatus and delete the contract information subjected to the retreat processing after a predetermined time has elapsed since the execution of the retreat processing.

5. A management apparatus that can manage an image forming apparatus, comprising at least one processor coupled via a bus to a memory, the processor being programmed to control one or more of:
   a request receiving unit configured to receive an operational setting information generation request that corresponds to the image forming apparatus from the image forming apparatus;
   a generating unit configured to generate operational setting information that corresponds to the image forming apparatus based on configuration information of a device included in the image forming apparatus, which is included in the operational setting information generation request;
   a transmitting unit configured to transmit the generated operational setting information to the image forming apparatus;
   a retreat processing unit configured to perform retreat processing for encrypting and retreating management information of the image forming apparatus, including at least management information of the operational setting information;
   a deletion processing unit configured to perform deletion processing for deleting the management information of the image forming apparatus,
wherein the retreat processing unit is configured to instruct the image forming apparatus, via the network, to retreat the management information of the image forming apparatus when the retreat processing is executed for information relating to the image forming apparatus held by the image forming apparatus, and
wherein the deletion processing unit is configured to instruct the image forming apparatus, via the network, to delete the information relating to the image forming apparatus held by the image forming apparatus when the deletion processing is executed for the management information of the image forming apparatus.

* * * * *